US009720848B2

(12) United States Patent
Kanno et al.

(10) Patent No.: US 9,720,848 B2
(45) Date of Patent: Aug. 1, 2017

(54) STORAGE DEVICE AND CONTROL METHOD FOR STORAGE DEVICE

(71) Applicant: HITACHI, LTD., Tokyo (JP)

(72) Inventors: Shinichiro Kanno, Tokyo (JP); Nobuyuki Osaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/770,881

(22) PCT Filed: Jul. 8, 2013

(86) PCT No.: PCT/JP2013/068595
§ 371 (c)(1),
(2) Date: Aug. 27, 2015

(87) PCT Pub. No.: WO2015/004706
PCT Pub. Date: Jan. 15, 2015

(65) Prior Publication Data
US 2016/0117263 A1    Apr. 28, 2016

(51) Int. Cl.
*G06F 12/14* (2006.01)
*G06F 21/62* (2013.01)
(Continued)

(52) U.S. Cl.
CPC .......... *G06F 12/1408* (2013.01); *G06F 21/62* (2013.01); *H04L 9/088* (2013.01);
(Continued)

(58) Field of Classification Search
CPC ......... G06F 12/1408; G06F 2212/1052; H04L 63/061
(Continued)

(56) References Cited

U.S. PATENT DOCUMENTS 7,904,709 B2 *   3/2011   Bajar .................. H04L 63/0428
                                                              380/259
8,010,810 B1     8/2011   Fitzgerald et al.
(Continued)

FOREIGN PATENT DOCUMENTS

JP    2007-157049 A    6/2007
JP    2008-278469 A    11/2008
JP    2009-098719 A    5/2009

OTHER PUBLICATIONS

Nabeel, "Privacy Preserving Delagated Access Control in the Storage as a Service Model", Aug. 2012, IEEE, p. 645-652.*

*Primary Examiner* — Taghi Arani
*Assistant Examiner* — Gregory Lane
(74) *Attorney, Agent, or Firm* — Volpe and Koenig, P.C.

(57) ABSTRACT

Key information that is currently in use is archived in a management server to prevent the key information from being lost. A storage device 10 is communicatably connected to a management server 60 managing key information 1. The storage device includes a memory device 21, and a controller 100 controlling the memory device. The controller implements encryption processing on data inputted and outputted to and from the memory device by using the key information. When stoppage of an operation is indicated, the controller determines whether the key information used by the controller is managed by the management server, stops the operation in a case where the key information is managed by the management server, and does not stop the operation in a case where the key information is determined not to be managed by the management server.

10 Claims, 21 Drawing Sheets

(51) Int. Cl.
  *H04L 29/06* (2006.01)
  *H04L 9/08* (2006.01)
  *H04L 29/08* (2006.01)
(52) U.S. Cl.
  CPC ............ *H04L 9/0894* (2013.01); *H04L 63/00* (2013.01); *H04L 63/061* (2013.01); *H04L 67/1097* (2013.01); *G06F 2212/1052* (2013.01)
(58) Field of Classification Search
  USPC ............................................ 713/171; 380/46
  See application file for complete search history.

(56) References Cited

U.S. PATENT DOCUMENTS

| | | | |
|---|---|---|---|
| 8,213,620 B1* | 7/2012 | Sussland | H04L 9/083 380/278 |
| 8,316,237 B1* | 11/2012 | Felsher | H04L 9/0825 380/282 |
| 2003/0099361 A1* | 5/2003 | Uchida | H04L 63/04 380/277 |
| 2004/0117310 A1* | 6/2004 | Mendez | G06F 21/62 705/50 |
| 2005/0220296 A1* | 10/2005 | Kawell | G06F 21/10 380/1 |
| 2007/0136606 A1 | 6/2007 | Mizuno | |
| 2008/0095375 A1* | 4/2008 | Tateoka | H04L 9/085 380/282 |
| 2008/0219449 A1 | 9/2008 | Ball et al. | |
| 2009/0327739 A1* | 12/2009 | Relyea | H04L 63/062 713/182 |
| 2010/0031056 A1* | 2/2010 | Harada | G06F 21/78 713/193 |
| 2010/0031058 A1 | 2/2010 | Kito et al. | |
| 2011/0261964 A1* | 10/2011 | Kahler | H04L 9/0825 380/286 |
| 2012/0008772 A1* | 1/2012 | Sugahara | G06F 21/79 380/46 |

* cited by examiner

FIG.4

| Key information 63 | |
|---|---|
| Number | Key201 |
| Forming day and time | 2013/02/02 10:45:32.555 |
| kind of key | Symmetric Key |
| Device number | Storage401 |
| Key using situation management | Yes |
| Using situation finally confirming day and time | 2013/02/10 15:15:43.321 |
| Presence of use | Yes |
| Key data | 87289738647896874923...8748914786178 |

FIG.5

| Device information 62 | |
|---|---|
| Number | Storage401 |
| Information for connecting to storage | IP:10.231.54.22<br>Port:8080<br>Client certificate: bd867826499.....2837648992<br>Server certificate:<br>　　　　　　de27836766412385.....456474534343 |
| Information in being connected from storage | Client certificate: ad689239816.....9786567191<br>Server certificate: 2378466347869....32746472389 |
| Storage information | Machine kind: RAID800<br>Manufacture number: 0387 |
| Day and time of finally connecting to storage | 2013/02/10 15:15:43.321 |

FIG.6

| Key number information103 | |
|---|---|
| Key number in storage | Internal_Key1 |
| Key management server number | KeyStore_111 |
| Key number in key management server | Key201 |
| Set day and time | 2013/02/02 10:45:32.555 |
| Finally confirming day and time | 2013/02/10 15:15:43.321 |

FIG.7

| Key table 102 | |
|---|---|
| Key number in storage | Internal_Key1 |
| Key data | 87289738647896874923...8748914786178 |

FIG.8

| Set information for connecting to key management server 164 | |
|---|---|
| Number | KeyStore_111 |
| Information for connecting to key management server | IP:10.231.54.1<br>Port: 5636<br>Client certificate: ad689239816.....9786567191<br>Server certificate: 2378466347869....32746472389 |
| Information in being connected from key management server | Client certificate: bd867826499.....2837648992<br>Server certificate: de27836766412385.....456474534343 |

STORAGE DEVICE AND CONTROL METHOD FOR STORAGE DEVICE

TECHNICAL FIELD

This invention relates to a storage device and a control method for a storage device.

BACKGROUND ART

There is utilized a storage device having an encryption function in order to protect security of data. The storage device having the encryption function encrypts data by using an encryption key to preserve to a memory device. If the encryption key vanishes, the encrypted data cannot be decrypted, and therefore, the data practically vanishes as a matter of fact. On the other hand, it is not preferable from a view point of security to store the encryption key and the data encrypted by using the encryption key to the storage device. Because if a total of the storage device is stolen, the encrypted data is decrypted, and there is a concern of leaking information.

Hence, there is proposed a technology in which an encryption key is stored to a management server which is physically different from a storage device, and the storage device acquires to use the encryption key from the management server when it is needed (PTL 1).

CITATION LIST

Patent Literature

[PTL 1]
U.S. Pat. No. 8,010,810

SUMMARY OF INVENTION

Technical Problem

According to the background art described in PTL 1, the encryption key used by the storage device is stored to the server for managing the key, and the encryption key is made to be able to be used by linking the storage device and the management server.

However, the management server is managed separately and independently from the storage device, and therefore, it is also possible to delete the encryption key regardless of a state of the storage device. Consequently, if the encryption key managed by the management server is erroneously deleted in a case where the storage device is brought into a stoppage state, the storage device cannot be started, or the encrypted data in the storage device cannot be used. Consequently, according to the background art, a reliability of archiving the encryption key used in the storage device is low.

This invention has been carried out in view of the problem described above, and its object is to provide a storage device and a control method for a storage device capable of improving the reliability. Other object of the invention is to provide a storage device and a control method for a storage device capable of preventing key information from being lost by archiving the key information currently in use in a management server.

Solution to Problem

A storage device according to an aspect of the present invention is a storage device communicatably connected to a management server of managing key information, the storage device includes: a memory device; and a controller configured to control the memory device, this controller being configured: to implement encryption processing on data inputted and outputted to and from the memory device by using the key information, to determine whether the key information used by the controller is managed by the management server when stoppage of an operation is designated; to stop the operation in a case where the key information is determined to be managed by the management server, and not to stop the operation in a case where the key information is determined not to be managed by the management server.

In the case where the key information is determined not to be managed by the management server, the controller may output a notification to that effect.

In the case where the key information is determined not to be managed by the management server, the controller may output a notification for confirming whether the key information is registered to the management server.

In a case where the key information is authorized to register to the management server, the controller may transmit the key information to the management server to register.

BRIEF DESCRIPTION OF DRAWINGS

FIG. 4 is an explanatory diagram showing a configuration example of key information stored in a key management server.

FIG. 5 is an explanatory diagram showing a configuration example of device information stored in the key management server.

FIG. 6 is an explanatory diagram showing a configuration example of information of managing a key number stored in the storage device for acquiring the key information.

FIG. 7 is an explanatory diagram showing a configuration example of a key table stored in the storage device.

FIG. 8 is an explanatory diagram showing a configuration example of setting information stored in the storage device for connecting to the key management server.

DESCRIPTION OF EMBODIMENTS

An explanation will be given of an embodiment of this invention in reference to the attached drawings as follows. However, caution is required to that the embodiment is only an example for implementing this invention, and does not limit a technical range of this invention. Plural features disclosed in the embodiment can variously be combined.

In explaining processing operation of the embodiment, an explanation may be given with "computer program" as an operation subject (the subject). The computer program is executed by a microprocessor. Consequently, the processor may be reread as the operation subject.

In the embodiment, so far as key information used in one device needs to be archived in an information processing system managed by the other device provided separately from the one device, the key information is held to the other device. In the embodiment, in the case where the other device does not hold the key information, vanishment of the key information is prevented by preventing the one device from being stopped. Also, in the embodiment, in the case where the other device does not hold the key information, the key information temporarily stored to the one device is transmitted to the other device to be held.

Figure 1:
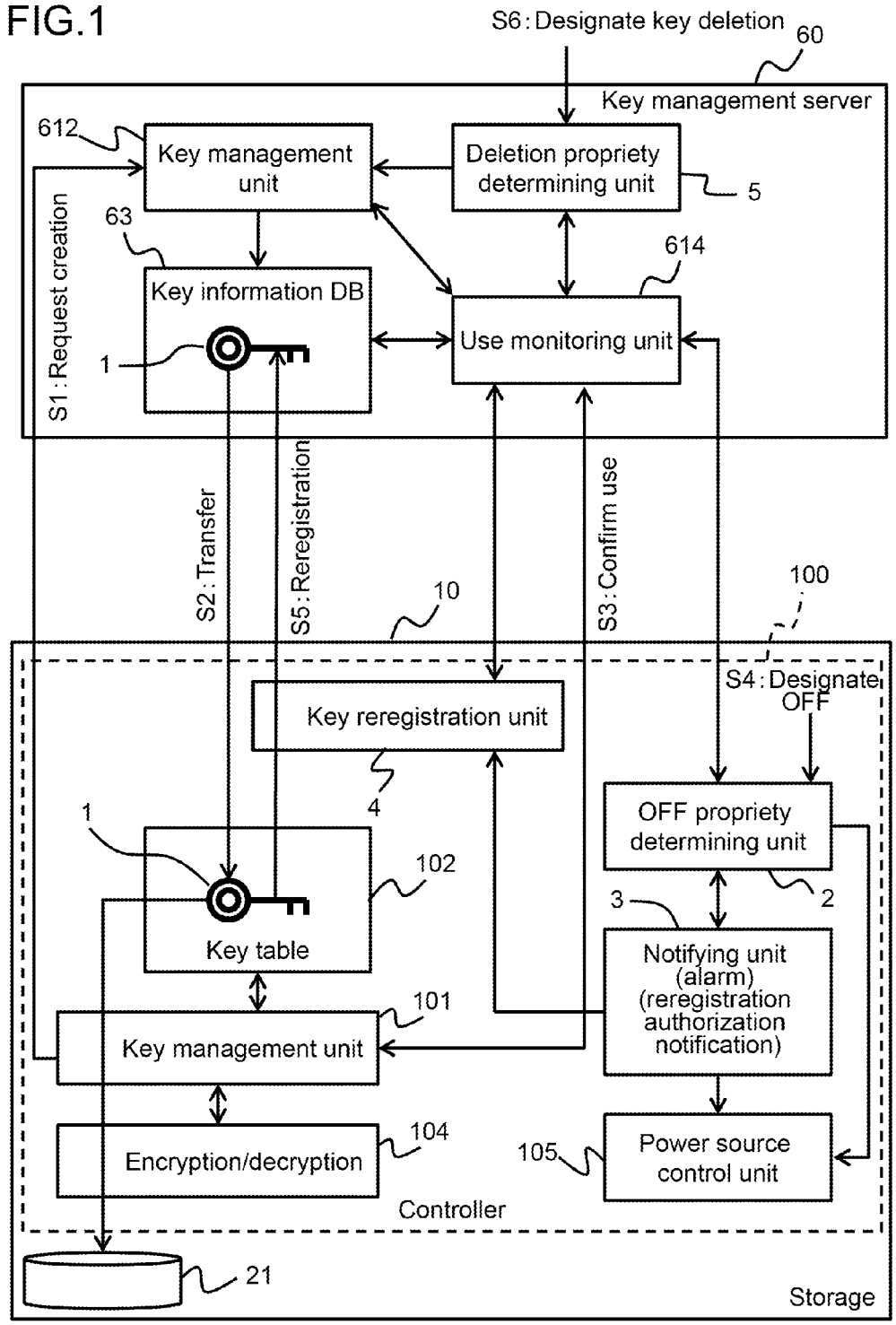
FIG. 1 is an explanatory diagram showing an outline of an embodiment of this invention.

FIG. 1 is an explanatory diagram showing an outline of the embodiment. A further detailed configuration of the embodiment will be described later in reference to the drawings of FIG. 2 and thereafter. FIG. 1 is used for understanding the embodiment and is not intended to limit the range of this invention to a configuration described in FIG. 1. A configuration devoid of a portion of the configuration shown in FIG. 1, and a configuration adding a new member or function to the configuration shown in FIG. 1 are included in the range of the invention.

The information processing system includes a key management server 60, and a storage device 10 for processing to encrypt data by using key information managed by the key management server 60 (hereinafter, also referred to key or encryption key). Pluralities of the key management servers 60 and the storage device 10 can be provided.

The storage device 10 includes a controller 100, and a memory device 21 controlled by the controller 100. The storage device 10 inputs and outputs data to and from the memory device 21 in accordance with a request from a host computer 30 at outside of the drawing as described later. In the embodiment, encryption processing includes both of encryption of converting ordinary sentence data to encrypted data by using the key, and decryption of decrypting the encrypted data by using the key.

The memory device 21 is configured by a physical memory device of a hard disk drive, a flash memory device or the like, and a logical memory device of a prescribed size or a variable size is created from a physical memory area of one or plural physical memory device(s). The logical memory device is also referred to as logical volume. Although here, an explanation will be given by taking an example of the logical memory device 21, the memory device 21 may be a physical memory device. The memory device 21 may be referred to as the logical volume 21. The memory device 21 of storing encrypted data (also referred to as encryption data) may be referred to as an encryption memory device in order to distinguish from a memory device of storing ordinary sentence data.

A key (encryption key) as key information used by the storage device 10 is created by the key management server 60 configured as an exclusive device for managing the key, and managed by the key management server 60 in order to ensure security. The storage device 10 acquires the key from the key management server 60 to use in a case of needing the key, for example, when the device is started, in a case of inputting and outputting data to and from the encryption memory device 21 or the like. When an operation is stopped by making a power source of the storage device 10 OFF, the key in the storage device 10 vanishes. Consequently, even when only the storage device 10 is removed to take away, the key is not present in the storage device 10, and therefore, leakage of data of the encryption memory device can be prevented.

Creation and registration of the key will be explained. A key management unit 101 of managing the key in the storage device 10 requests a key management unit 612 of managing the key in the key management server 60 to create the key (S1).

The key management unit 612 on the server side creates a new key 1 to register to a key information storing unit 63. The new key 1 is transferred from the key management server 60 to the storage device 10 to be stored to a key cable 102 of the storage device 10 (S2). The key table 102 is stored in an area of a volatile memory, and therefore, when a power source of the storage device 10 is made OFF to stop the storage device 10, the key table 102 vanishes.

An encryption/decryption unit 104 (hereinafter, also referred to as an encryption processing unit 104) receives the key 1 from the key table 102 via the key management unit 101, and inputs and output data to and from the encryption memory device 21 by using the key 1. The encryption processing unit 104 encrypts data, or decrypts encrypted data by using the key 1 temporarily stored to the key table 102 during a time period of supplying a power source to the storage device 10.

A use monitoring unit 614 of the key management server 60 monitors a situation of using the key in the storage device 10 (S3). The use monitoring unit 614 can confirm the key used in the storage device 10 at predetermined timings, or at a constant period.

Although the storage device 10 can continuously be operated for 24 hours in 365 days, there is also a case of stopping the storage device 10 from reason of, for example, a maintenance operation, a change in the configuration of the information processing system or the like. When a storage manager or the like designates to make the power source OFF to the storage device 10 (S4), an OFF propriety determining unit 2 of determining a propriety of making the power source OFF confirms whether all of keys used in the storage device 10 are being managed by the key management server 60. "Keys are being managed" signifies that the keys are stored to the key information storing unit 63.

When the OFF propriety determining unit 2 determines that the key management server 60 manages all the keys used in the storage device 10, the OFF propriety determining unit 2 designates to make the power source OFF to a power source control unit 105 controlling the power source of the storage device 10. The designated power source control unit 105 stops supplying the power source to a microprocessor, a memory, the memory device 21 or the like.

In contrast thereto, when the OFF propriety determining unit 2 determines that any one of all the keys used in the storage device 10 is not managed by the key management server 60, the OFF propriety determining unit 2 outputs an alarm via a notifying unit 3.

The alarm includes information indicating that, for example, the storage device 10 is going to be stopped even when a number of keys in the keys used in the storage device 10 are not stored to the key management server 60. The alarm can be displayed, for example, at a management terminal 50 (refer to FIG. 2) used by the storage manager, or a portable terminal (including portable telephone) owned by the storage manager. The alarm may be configured not only as a text message but as a voice message.

The notifying unit 3 can also outputs a notification requesting authorization of reregistration of a key in place of the alarm, or along with the alarm. The reregistration of a key signifies that at least a portion of keys used in the storage device 10 is transmitted to store to the key management server 60. When the storage manager receives the notification requesting authorization of reregistration, the storage manager authorizes to the storage device 10 the re-registration of the key to the key management server 60.

A key reregistration unit 4 of reregistering a key transmits a key of a reregistration object in keys stored to the key table 102 to the key management server 60 to store to the key information storing unit 63 (S5). Here, the OFF propriety determining unit 2, the notifying unit 3, and the key reregistration unit 4 are materialized as one or plural step(s) of flowcharts (FIG. 12, FIG. 13, FIG. 14, and FIG. 16) described later.

The server manager can designate to delete a portion or a total of keys managed by the key management server 60 (S6). The key management server 60 and the storage device 10 are configured as respectively separate devices, and installed at locations remote from each other. Also, there is a case where the plural key management servers 60 and the plural storage devices 10 are corresponded in multiple versus multiple from a view point of security and reliability. Consequently, a server manager managing a certain one of the key management server 60 may not necessarily be well informed of all of the storage devices 10 keys of which are managed by the key management server 60, but there is a concern that the server manager issues an erroneous deletion designation to the key management server 60.

A deletion propriety determining unit 5 of the key management server 60 determines whether a deletion designation is pertinent, and is materialized as one or plural step(s) in flowcharts (FIG. 15, FIG. 20, and FIG. 21) described later indicating deletion of key. The deletion propriety determining unit 5 determines whether deletion of the key is pertinent based on a state of using the key of a deletion object. In a case where the deletion propriety determining unit 5 determines to authorize to delete a key, the key management unit 612 deletes the object key from the key information storing unit 63.

In the embodiment configured in this way, in a case where there is a possibility of losing the key 1 used in the storage device 10, the possibility of losing the key 1 is restrained. For example, in a case where the key management server 60 does not hold the key 1 used in the storage device 10, and in a case where the power source of the storage device 10 is designated to be made OFF, the power source is not made OFF. In this case, the power source of the storage device 10 is made OFF after the key 1 in the storage device is transmitted to the key management server 60 to reregister.

Consequently, according to the embodiment, the key used in the storage device 10 can be prevented from being lost in the information processing system beforehand, and reliability can be improved. Also, according to the embodiment, the key held only by the storage device 10 can be transmitted to the key management server 60 to reregister, and therefore, handiness of use is improved.

In other words, in the embodiment, so far as the key needs to be archived, the key is archived in the key management server 60, and therefore, security and reliability of an information processing system (storage system) separately provided with the key management server 60 and the storage device 10 can be improved.

EXAMPLE 1

Example 1 will be in reference to FIG. 1 through FIG. 15. FIG. 1 is a block diagram showing a hardware configuration of a storage system including the storage device 10. The storage system may include, for example, at least one of the storage device 10, at least one disk mounting unit 20, at least one host computer (hereinafter, host) 30, at least one management terminal 50, and at least one of the key management server 60. The storage system may further include an external storage device 40.

In the example, the plural storage devices 10 are provided, and the respective storage devices 10 are connected with the respective management terminals 50. The plural storage devices 10 are made to be able to correspond to the plural key management servers 60.

Explaining first a connection configuration, the host 30 and the storage device 10 are connected via a network CN1 for inputting and outputting data. The storage device 10 and the external storage device 40 are connected via a communication network CN2 for external connection. The management terminal 50 as well as the key management server 60 and the storage device 10 are connected via a managing communication network CN3. The controller 100 of the storage device 10 and the disk mounting unit 20 are connected via a disk inputting and outputting network CN4.

The communication networks CN1, CN2, and CN3 can use, for example, FC-SAN (Fibre Channel-Storage Area Network), or IP-SAN (Internet Protocol-Storage Area Network). The communication network CN3 can use, for example, IP (Internet Protocol) network of LAN (Local Area Network) or the like. A total or a portion of the respective communication networks CN1 through CN4 may be configured as a common communication network.

Figure 2:
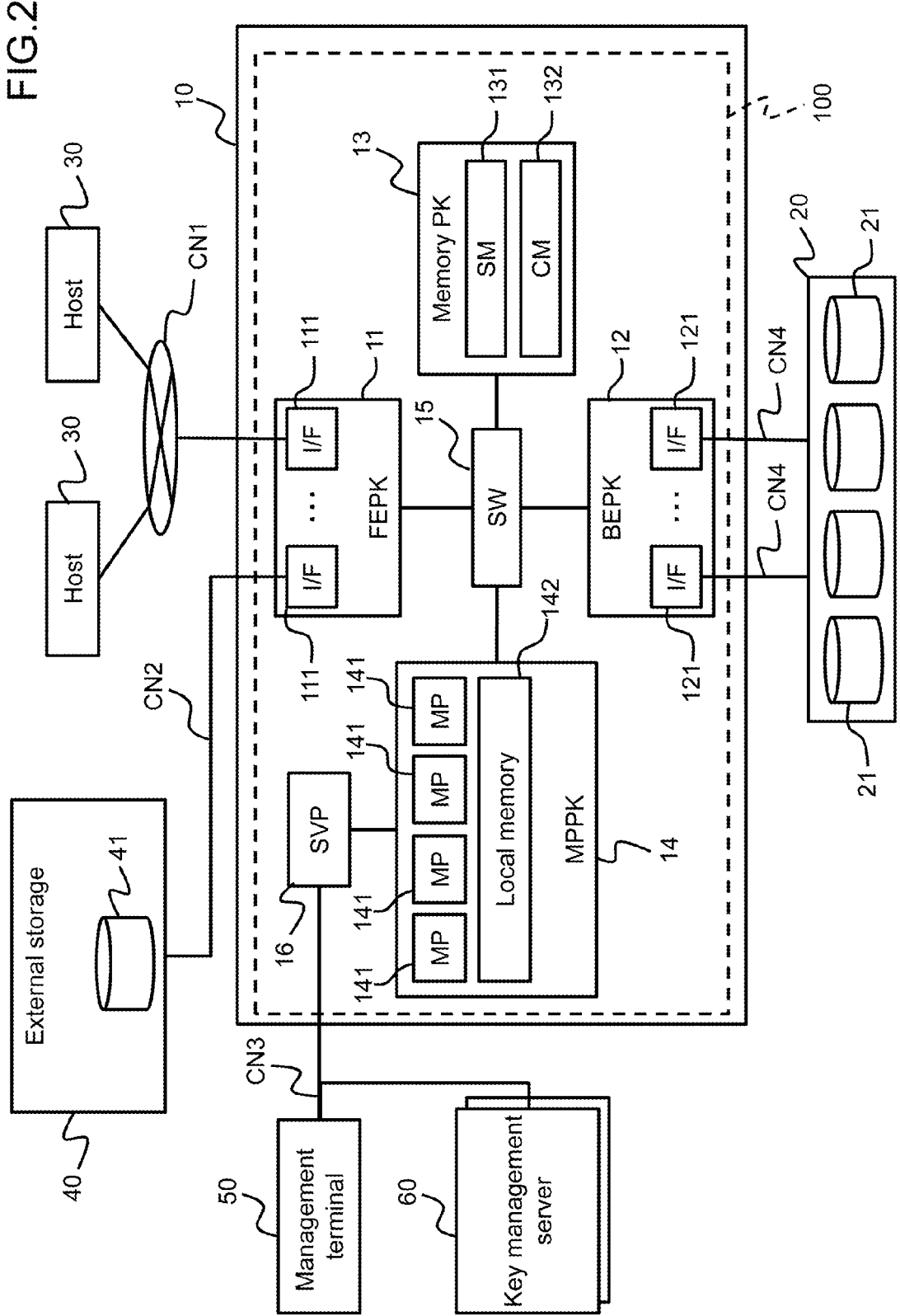
FIG. 2 is a hardware configuration diagram of an information processing system including a storage device.

The storage device 10 includes the controller 100. The controller 100 processes commands from the hosts 30 and inputs and outputs data to and from the memory devices 21 in the disk mounting unit 20 in accordance with the commands. The controller 100 returns processing results of the commands to the hosts 30 of issuance origins. Also, the controller 100 determines propriety of designating to make the power source to the controller 100 OFF, or answers to an inquiry from the key management server 60 in order to prevent a key used in the encryption processing from being lost. Although the single controller 100 is shown in FIG. 2, the plural controllers 100 may be provided in the single storage device 10 in order to disperse a load or realize redundancy.

The disk mounting unit 20 includes the plural memory devices 21. The memory device 21 is a logical memory device created by utilizing one or plural physical memory device(s). For example, various devices capable of reading and writing data of hard disk device, semiconductor memory device, optical disk device, photomagnetic disk device and the like can be pointed out as the physical memory device (s). As hard disk devices, for example, there are FC (Fibre Channel) disk, SCSI (Small Computer System Interface) disk, SATA disk, ATA (AT Attachment) disk, SAS (Serial Attached SCSI) disk and the like.

Further, for example, various memory devices of flash memory, FeRAM (Ferroelectric Random Access Memory), MRAM (Magnetoresistive Random Access Memory), a phase change memory (Ovonic Unified Memory), RRAM (registered trade mark), ReRAM (Resistive Random Memory) and the like may also be used. Further, a configuration of mixing memory devices of different kinds of, for example, a flash memory device and a hard disk device will do.

For example, the logical memory device 21 (logical volume 21) can be obtained by managing physical memory areas of plural physical memory devices as RAID (Redundant Arrays of Inexpensive Disks) group, and cutting out a storage area of a prescribed size or a variable size from the physical memory area which is made virtual as the RAID group. The memory device 21 is corresponded to the host 30 via a communication port of the controller 100, and is used by the host 30.

The disk mounting unit 20 may be provided in a cabinet accommodating the controller 100, or may be provided in a cabinet different from the cabinet accommodating the controller 100. Incidentally, the storage device 10 needs not to be necessarily configured as a storage device since a memory device 41 provided to the external storage device 40 may also be utilized as described later. For example, the device 41 may be configured as an appliance device for processing encryption, or may be configured as a switch device.

The external storage device 40 is a device utilized by the storage device 10. The device is referred to as the external storage device 40 since the device is present at an external portion in view from the storage device 10 that is the device of an origin of utilizing the external storage device 40. A memory space of the logical memory device 41 provided to the external storage device 40 is mapped to a memory space of a virtual memory device controlled by the controller 100 of the storage device 10. Although in FIG. 2, only one of the external storage device 40 is shown, the storage device 10 can utilize the plural external storage devices 40.

The controller 100 provides a virtual memory device to the host 30, and writes write data from the host 30 to the memory device 41 of the external storage device 40. When the controller 100 receives a read command from the host 30, the controller 100 reads data from the memory device 41 of the external storage device 40, and transmits the data to the host 30. Consequently, the storage device 10 provides the memory device 41 provided to the external storage device 40 to the host 30 as if the memory device 41 of the external storage device 40 were the memory device 21 of the storage device 10.

The host 30 is a computer of writing data to the storage device 10 and reading data from the storage device 10, and is configured in a way of, for example, a server. The host 30 can also provide a data processing service to a client device at outside of the drawing.

The management terminal 50 is a computer terminal for operating the storage device 10. The system manager may designate the storage device 10 via the management terminal 50, or display a state of the storage device 10 on a screen of the management terminal 50. The management terminal 50 includes an input device for making the system manager (storage manager) input designation or information, and an output device for providing information to the system manager. As the input device, there is, for example, a key board, a touch panel, a pointing device, a voice inputting device, a line of sight detecting device, an action detecting device, a brain wave detecting device or the like. As the output device, there is, for example, a display, a printer, a voice synthesizing device or the like.

The key management server 60 is a computer for managing an encryption key used by the storage device 10. The key management server 60 is connected to an operating computer (not illustrated) provided separately. The system manager (server manager) may designate the key management server 60 by using the operating computer. Incidentally, in a case where the storage manager and the server manager are common, the management terminal 50 may be configured to be able to operate both of the key management server 60 and the storage device 10.

The key management server 60 includes a microprocessor, a memory, an auxiliary memory device, a communication interface, a user interface and so on, and a prescribed computer program is stored to the memory or the auxiliary memory device. A prescribed processing for creating, archiving, deleting (invalidating) a key, or monitoring a state of using a key at the storage device 10 is realized by making the microprocessor read and execute the prescribed computer program. A function for realizing the key management server 60 will be described later in reference to FIG. 3.

The controller 100 of the storage device 10 will be explained. The controller 100 for controlling the storage device 10 includes, for example, a front end interface 11, a back end interface 12, a memory package 13, a microprocessor package 14, a switch 15, and a service processor 16.

The front end interface 11 is a device in charge of communication with the host 30 and the external storage device 40. The front end interface 11 includes plural communication interfaces 111. The communication interfaces 111 are connected to the host 30 and the external storage device 40 via a communication network. The single host 30 may be configured to be able to communicate with the plural communication interfaces 111 in order to realize a redundancy of communication. Similarly, the single external storage device 40 may be configured to be able to communicate with the plural communication interfaces 111.

The back end interface 12 is a device in charge of communication with the respective memory devices 21 and includes plural communication interfaces 121. The communication interfaces 111 are connected to communication ports of physical memory devices creating the memory devices 21. The back end interface 12 is made to be able to make access to the physical memory device from plural paths different from each other in order to realize a redundancy.

The memory package 13 includes a shared memory 131 and a cash memory 132. The shared memory 131 stores control information or management information. The cash memory 132 temporarily stores data written from the host 30 or data read from the memory device 21. Also, the cash memory 132 stores key information used in the storage device 10.

The microprocessor package 14 includes plural microprocessors 141 and a local memory 142. The local memory 142 stores, for example, necessary information or computer programs in information stored to the shared memory 131. When the front end interface 11 receives a command from the host 30, any one microprocessor 141 of the plural microprocessors 141 noticing the reception of command processes the command. The microprocessor 141 which has processed the command returns a processing result to the host 30 via the front end interface 11.

The service processor (designated as SVP in the drawing) 16 is a device for managing a change in the configuration of the storage device 10 and the like. For example, the service processor 16 outputs a state of the storage device 10 to the management terminal 50 or the key management server 60, changes the configuration of the storage device 10 in accordance with an input from the management terminal 50, or communicates with the key management server 60.

Figure 3:
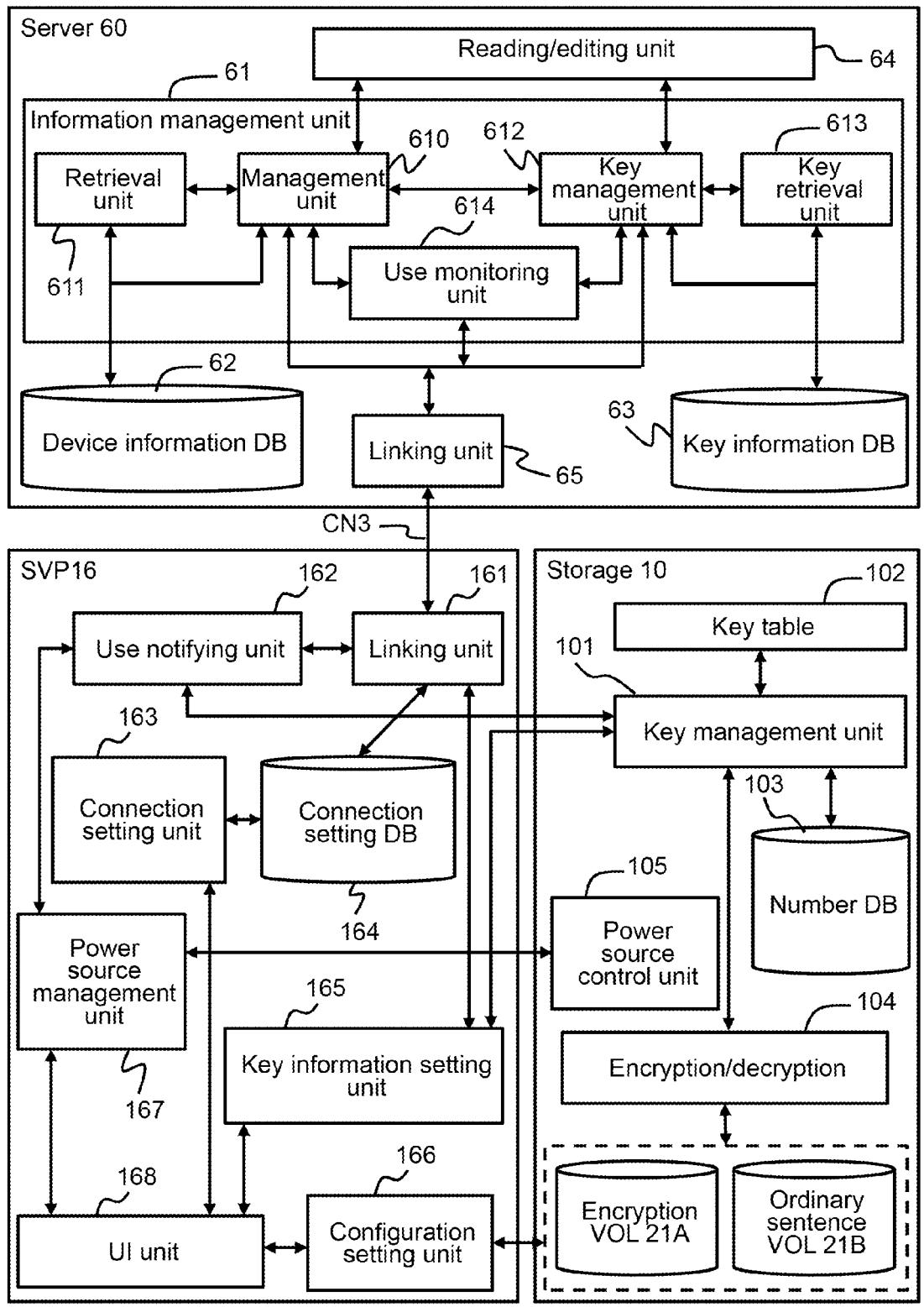
FIG. 3 is a functional block diagram of the information processing system including the storage device.

FIG. 3 is a block diagram showing a functional configuration of a storage system. In the drawing, the key management server 60 may be abbreviated as the server 60 or the management server 60, and the storage device 10 may be abbreviated as the storage 10.

The key management server 60 includes, for example, an information management unit 61, a device information storing unit 62, a key information storing unit 63, a reading/editing unit 64, and a linking unit 65.

The information management unit 61 performs a function for managing key information and information of the device 10 using the key information, and is configured as a software module.

The device information storing unit 62 is a memory area storing device information. The device information is information concerning a device using the key information (storage device 10 in the example), and is managed as a database.

The key information storing unit 63 is a memory area for storing the key information (there is a case where the key information is abbreviated as key) which is used for encryption processing. The key information storing unit 63 can store plural pieces of key information. Key numbers are corresponded to the plural pieces of the information, and retrieval or the like is made to be able to perform by designating the key number.

The reading/editing unit 64 performs a function for making the system manager (server manager) read or set to operate the information of configuring the key management server 60.

The linking unit 65 performs a function for communicating with an external device (storage device 10 in the example). The linking unit 65 performs an authentication in a case where the linking unit 65 is connected from the external device and an authentication in a case where the linking unit 65 is connected to the external device.

The information management unit 61 includes, for example, a device information management unit 610, a device information retrieval unit 611, a key management unit 612, a key retrieval unit 613, and a use monitoring unit 614. In the drawing, the device information management unit 610 is abbreviated as the management unit 610, and the device information retrieval unit 611 is abbreviated as the retrieval unit 611.

The device information management unit 610 manages device information stored to the device information storing unit 62. The device information management unit 610 stores device information to the device information storing unit 62, or deletes device information stored to the device information storing unit 62. The device information retrieval unit 611 retrieves device information stored to the device information storing unit 62.

The key management unit 612 manages key information stored to the key information storing unit 63. The key retrieval unit 613 retrieves key information stored to the key information storing unit 63.

The use monitoring unit 614 monitors whether a device specified by the device information stored to the device information storing unit 62 uses key information stored to the key information storing unit 63.

The service processor 16 performs a function as a device for managing the storage device 10 along with the management terminal 50. Hereinafter, the service processor is abbreviated as SVP. SVP 16 shown in FIG. 3 or the like communicates with the key management server 60, or sets key information to the controller 100.

SVP 16 includes, for example, a linking unit 161, a use notifying unit 162, a connection setting unit 163, a connection setting storing unit 164, a key information setting unit 165, a configuration setting unit 166, a power source management unit 167, and a user interface unit 168 (hereinafter, UI unit 168).

The linking unit 161 performs a function for communicating with the key management server 60. The linking unit 161 also executes an authentication in the case where the linking unit 161 is connected from the key management server 60, and an authentication in the case where the linking unit 161 is connected to the key management server 60.

The use notifying unit 162 performs a function of notifying a state of using a key at the storage device 10 to the key management server 60. The state of using the key may include time (for example, time indicated by a style of year month day hour minute second) at which the key is used.

The connection setting unit 163 performs a function for preserving information for connecting the key management server 60 to the connection setting storing unit 164. As information for connecting to the key management server 60, there is, for example, IP address or authentication information. The connection setting storing unit 164 is a memory area for preserving the connection setting information for connecting to the key management server 60.

The key information setting unit 165 performs a function of setting key information to the storage device 10. The configuration setting unit 166 performs a function of setting a configuration of the storage device 10. As configuration setting, there is, for example, creation and deletion of the memory device 21, designation of encryption of the memory device 21, correspondence between the memory device 21 and the host 30 or the like.

The UI unit 168 performs a function for making the system manager (storage manager) designate the storage device 10, and setting to change a configuration of the storage device 10 by using the input device and the output device provided to the management terminal 50.

A function concerning an encryption key in functions provided to the storage device 10 will be explained. The storage device 10 includes, for example, a key management unit 101, a key table 102, a number storing unit 103, an encryption/decryption (encryption processing unit) 104, and memory devices 21A and 21B concerning the encryption key.

The key management unit 101 performs a function of managing or retrieving the key information used in the storage device 10. The management of the key information and the retrieval of the key information may be provided as separate functions. The key management unit 101 is realized by, for example, the microprocessor 141.

The key table 102 stores the key information used in the storage device 10. The key table 102 is stored to, for example, the cash memory 132.

The key number storing unit 103 is a memory area of storing the key number corresponded to the key. The storage device 10 requests the key to the key management server 60 by showing the key number. The key number storing unit 103 is provided at an involatile memory area in the memory area provided to the memory package 13. Because in a case where the storage device 10 is restarted, it is necessary to acquire the key from the key management server 60 based on the key number stored to the key number storing unit 103. Consequently, there may be constructed a configuration in which the key number is stored to the prescribed memory device 21 in the plural memory devices 21 in place of the memory package 13. Incidentally, the key number is abbreviated as number in the drawing.

The encryption/decryption unit 104 (encryption processing unit 104) performs a function of encrypting data by using the key and decrypting data by using the key. The encryption/decryption unit 104 is provided at, for example, the back end interface 12.

The power source control unit 105 performs a function of controlling an operation of a power source device (not illustrated) of the storage device 10. The power source control unit 105 stops an operation by making a power source of the storage device 10 OFF by designation from a power source management unit 167 of SVP 16. The power source control unit 105 is realized by, for example, the microprocessor 141.

FIG. 3 shows two kinds of the memory devices 21 having different modes of use. The memory device 21 on one side is an encryption memory device 21A which is designated with encryption. The memory device 21B on the other side is an ordinary memory device 21B which is not designated with encryption.

FIG. 4 shows a configuration example of the key information stored to the key information storing unit 63. For example, the key information is managed in correspondence with number, forming day and time, kind of key, device number, key using situation management, using situation finally confirming day and time, presence of use, and key data for each key.

Number is identification information for uniquely specifying key, forming day and time is information showing day and time of forming key. Kind of key is information showing kind of key. Device number is identification information for uniquely specifying device (storage device) using key. Key using situation management is information for determining whether situation of using key is managed. Using situation finally confirming day and time is information showing newest day and time of confirming situation of using key. Presence of use is information showing whether key is used. Key data is data of key.

FIG. 5 shows a configuration example of device information stored to the device information storing unit 62. The device information is managed in correspondence with, for example, number, information for connecting to storage, information in being connected from storage, storage information, information of finally connecting to storage for each device.

Number is identification information for uniquely specifying the storage device 10. Information for connecting to storage is information necessary for the key management server 60 to connect to the storage device 10, and, for example, IP address, port number, client certificate, or server certificate. Information in being connected from storage is information used when the storage device 10 is connected to the key management server 60, and is, for example, client certificate or server certificate. Storage information is information concerning the storage device 10, and is, for example, machine kind, or manufacture number. Day and time of finally connecting to storage are day and time at which the key management server 60 finally makes access to the storage device 10, that is, information indicating newest access day and time.

FIG. 6 shows a configuration example of key number information stored to the key number storing unit 103. Key number information is a number for the storage device 10 to acquire an encryption key from the key management server 60. The key number information is managed in correspondence with, for example, key number in storage, key management server number, key number in key management server, set day and time, and finally confirming day and time for each key.

Here, key number in storage is identification information for managing the key in the storage device 10. The key number in storage is also referred to as storage side key number. Key management server number is information used in a case in which the key management server 60 is connected to the storage device 10, and information of the storage device 10 for identifying the key management server 60. Key number in key management server is identification information of the key management server 60 for managing the key. Key number in key management server is also referred to as server side key number. Set day and time are information indicating day and time at which the storage device 10 acquires the key from the key management server 60 to set to the storage device 10. Finally confirming day and time are information indicating final day and time (that is, newest day and time) at which the key management server 60 confirms presence of the key.

FIG. 7 is an explanatory diagram showing a configuration example of the key table 102. For example, the key table 102 is managed in correspondence with key number in storage and key data for each key.

Here, key number in storage is identification information for managing the key in the storage device 10. Key data is data of key specified by the key number.

FIG. 8 shows a configuration example of set information stored to the connection setting storing unit 164 for connecting to key management server. Set connection information is managed in correspondence with, for example, number, information for connecting to key management server, and information in being connected from key management server for each key management server.

Number is identification information for uniquely specifying the key management server 60. Information for connecting to key management server is information used when the storage device 10 is connected to the key management server 60, and is, for example, IP address, communication port number, client certificate, or server certificate. Information in being connected from key management server is information used when the key management server 60 is connected to the storage device 10, and is, for example, client certificate, or server certificate.

Figure 9:
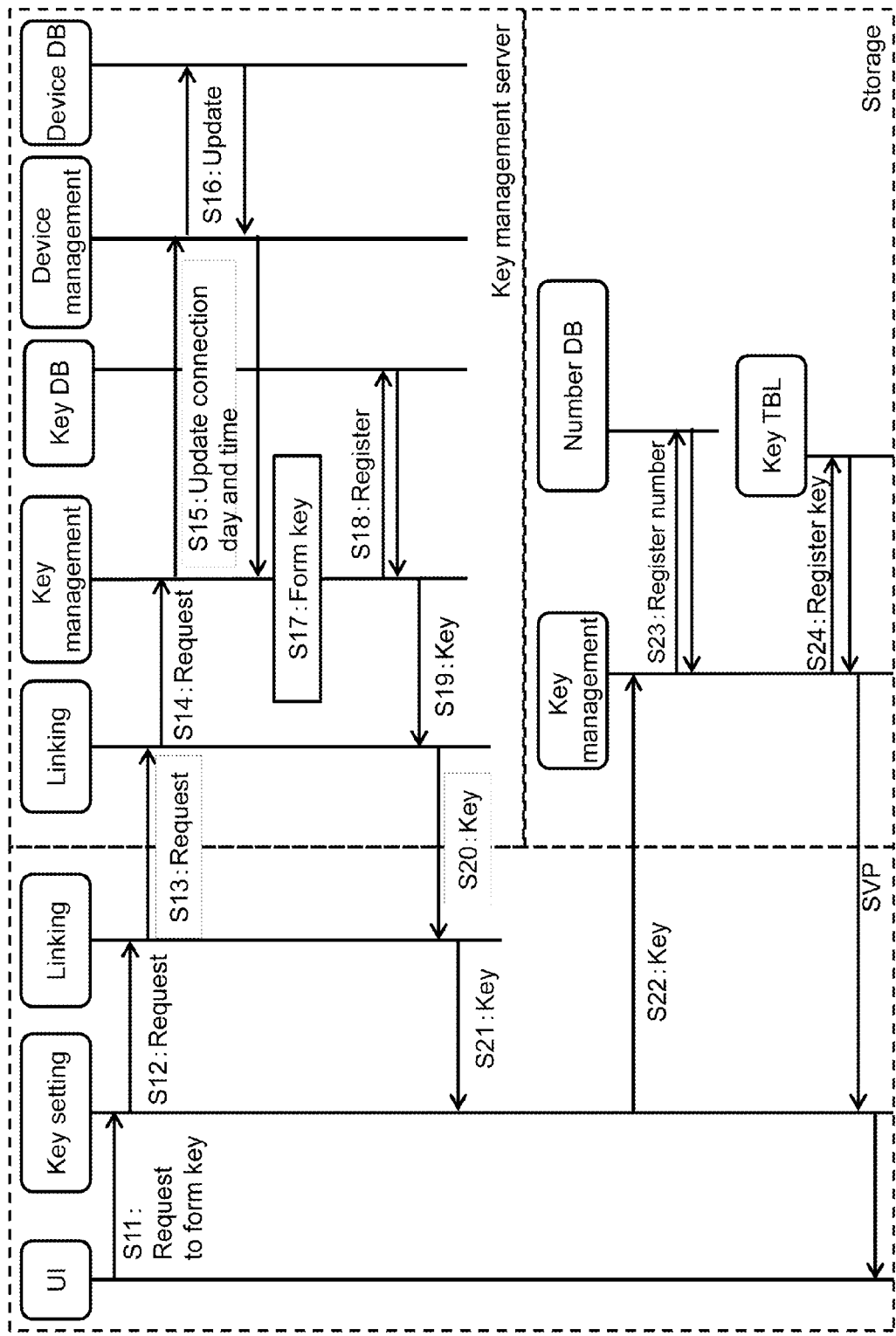
FIG. 9 is a flowchart showing processing of newly creating the key information.

FIG. 9 is a flowchart showing processing of newly forming an encryption key. The system manager requests to form a key from the UI unit 168 displayed on the management terminal 50 to the key information setting unit 165 of SVP 16 (S11). The request for forming the key is transmitted from the key information setting unit 165 to the linking unit 161 (S12), and transmitted from the linking unit 161 to the linking unit 65 of the key management server 60 via the communication network CN3 (S13). The request for forming the key includes information or the like for identifying the storage device 10 of an origin of the request.

The linking unit 65 transmits the request for forming the key to the key management unit 612 (S14). The key management unit 612 requests the device information management unit 610 to update day and time at which the storage device 10 requesting to form the key is connected to the key management server 60 (final connection day and time) (S15). The device information management unit 610 receiving the request makes access to a database in the device information storing unit 62, and updates the device information (S16).

On the other hand, the key management unit 612 forms a new key (S17) and registers the key to the database in the key information storing unit 63 (S18). The key management unit 612 transmits the formed key to the linking unit 65 (S19). The key is transmitted from the linking unit 65 to the linking unit 161 of the storage device 10 via the communication network CN3 (S20).

The linking unit 161 transmits the key acquired from the key management server 60 to the key information setting unit 165 (S21) and the key information setting unit 165 delivers the key to the key management unit 101 (S22). The key management unit 101 forms a key number for managing the newly formed key in the storage device 10, and registers the key number to a database in the key number storing unit 103 (S23). Further, the key management unit 101 registers data of the key newly formed by the key management server 60 (key information) to the key table 102 (S24).

Consequently, in a case where the storage device 10 needs a new key, the key is requested to form from the storage device 10 to the key management server 60, and the key formed at the key management server 60 is transmitted to the storage device 10, and set at the storage device 10.

Figure 10:
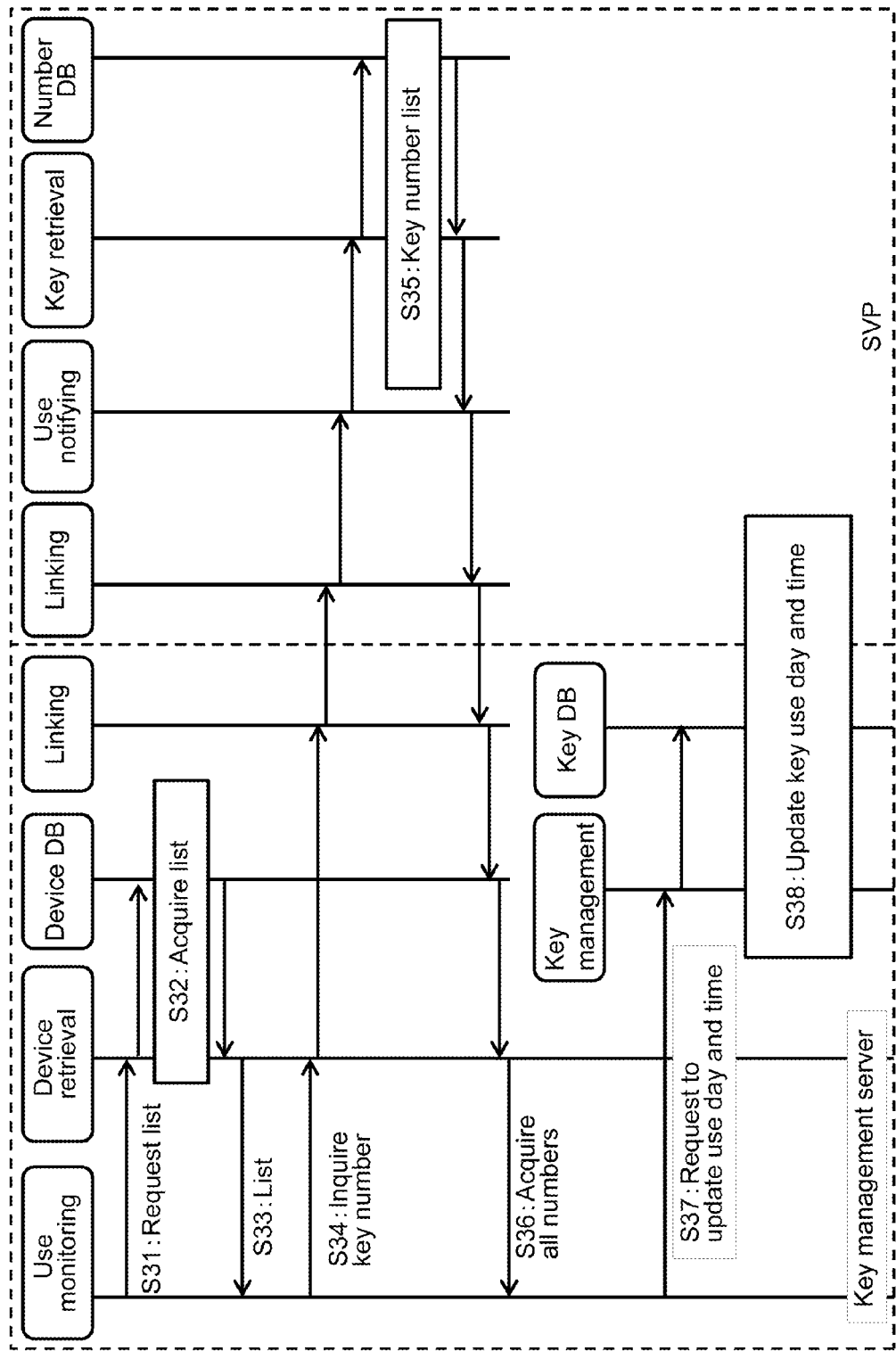
FIG. 10 is a flowchart showing processing of confirming a state of using the key information in the storage device by the key management server.

FIG. 10 is a flowchart showing processing in which the key management server 60 confirms a state of using a key in the storage device 10.

The use monitoring unit 614 of the key management server 60 requests a list of device information (information of storage device) to the device information retrieval unit 611 via the device information management unit 610 (S31). The single key management server 60 can manage the plural storage devices 10.

The device information retrieval unit 611 acquires the list of device information by retrieving the device information stored to the database in the device information storing unit 62 (S31), and transmits the list to the use monitoring unit 614 (S33).

When the use monitoring unit 614 receives the list of the storage device 10 managed by the key management server 60 from the device information retrieval unit 611, the use monitoring unit 614 inquires with all of the storage devices 10 described in the list about key numbers of the keys being used (S34). The inquiry of the key number is transmitted from the linking unit 65 to the linking units 161 of the respective storage devices 10 via the communication network CN3. Although SVP 16 is in charge of an exchange with the key management server 60, the storage device 10 and SVP 16 may not be distinguished particularly from each other.

The linking unit 161 of SVP 16 delivers the inquiry of the key number received from the use monitoring unit 614 to the key management unit 101 of the storage device 10 (indicated as key retrieval in the drawing since retrieval can also be carried out) via the use notifying unit 162. The key management unit 101 acquires the list of numbers of keys being used by retrieving the database stored to the key number storing unit 103 of the storage device 10 (S35).

The use monitoring unit 614 of the key management server 60 receives the list of key numbers used in the storage device 10 via the use notifying unit 162, the linking unit 161, the communication network CN3, and the linking unit 65 (S36). The use monitoring unit 614 requests the key management unit 612 to update the final confirming day and time of a situation of using the key number acquired from the storage device 10 (S37).

The key management unit 612 updates finally confirming day and time concerning key information stored to the database in the key information storing unit 63 (S38). That day and time of finally confirming the situation of use is notified from the key management unit 612 to the use monitoring unit 614.

Consequently, the key management server 60 can update the final confirming day and time in the key information stored to the key information storing unit 63 by acquiring all the key numbers being used in the respective storage devices 10 under management via SVP 16.

Figure 11:
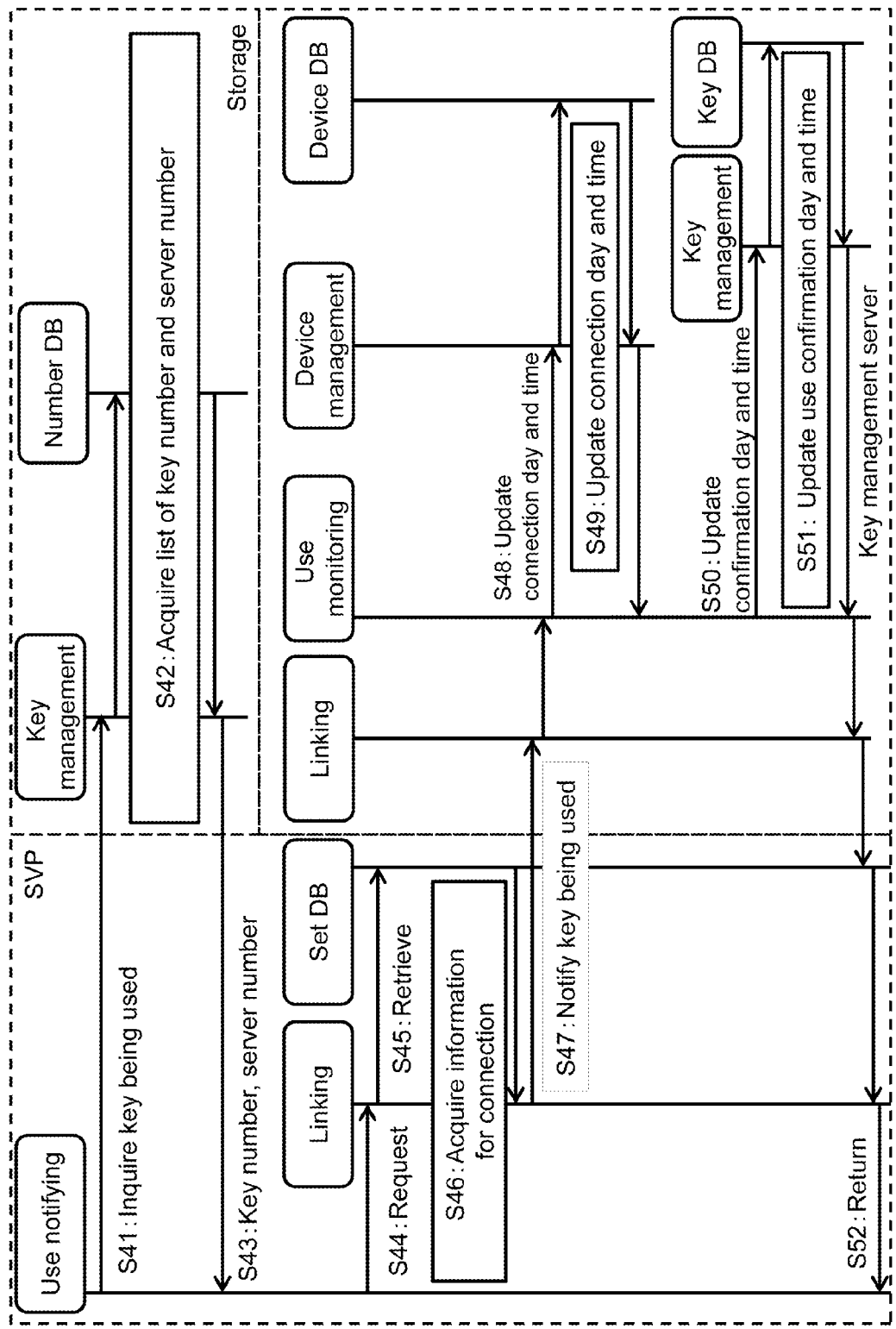
FIG. 11 is a flowchart showing processing of notifying the key management server of a state of using the key information in the storage device from the storage device.

FIG. 11 is a flowchart showing processing of notifying the key management server 60 of the key number being used in the storage device 10 from the storage device 10 (SVP 16).

The use notifying unit 162 of SVP 16 inquires with the key management unit 101 of the storage device 10 about a key being used (S41). The key management unit 101 acquires a list of key numbers being used and a list of server numbers of the key management server 60 managing keys by retrieving the database stored in the key number storing unit 103 (S42).

When the use notifying unit 162 acquires the list of key numbers and the list of numbers of the key management servers 60 managing the keys (S43), the use notifying unit 162 makes inquiry as to whether keys are held for respective key management servers managing keys in correspondence with the respective key numbers.

The use notifying unit 162 requests the linking unit 161 to investigate whether the key management servers 60 hold the keys (S44). The linking unit 161 acquires information for connecting to the key management servers 60 (S46) by retrieving the database stored to the connection setting storing unit 164 (S45).

The linking unit 161 is connected to the key management server 60 by using the connection setting information acquired from the connection setting storing unit 164, and notifies the linking unit 65 of the key management server 60 of the list of key numbers being used in the storage device 10 (S47). The linking unit 65 delivers the list of key numbers to the use monitoring unit 614. The information delivered from the linking unit 65 to the use monitoring unit 614 includes information for specifying the storage device 10 which is an origin of transmitting the list of key numbers.

The use monitoring unit 614 of the key management server 60 requests the device information management unit 610 to update day and time of connecting to the storage device 10 (S48). The device information management unit 610 updates day and time of finally connecting to the storage device concerning device information in the database stored to the device information storing unit 62 (S49). Incidentally, in the present example, updating day and time signifies updating day and time to present time.

The use monitoring unit 614 requests the key management unit 612 to update day and time of finally confirming a situation of using the key (S50). The key management unit 612 updates day and time of finally confirming a use situation concerning key information in the database stored to the key information storing unit 63 (S51). In a case where the use monitoring unit 614 discovers an unregistered key number which is not stored to the key information storing unit 63 in key numbers received from the storage device 10, the use monitoring unit 614 returns the unregistered key number to the use notifying unit 162 of SVP 16 (S52).

Consequently, it can be confirmed whether a key being used in the storage device 10 is managed (held) from the storage device 10 to the key management server 60 without awaiting for confirmation from the key management server 60. Also, in a case where an unregistered key is discovered, the key management server 60 can notify the storage device 10 of the case.

When the storage device 10 notices that a key which is not managed by the key management server 60 is present in keys being used in the storage device 10, the storage device 10 can register the key to the key management server 60. Even in a case where a key managed by the key management server 60 is deleted by an erroneous operation of the server manager or the like, the key is made to be able to be reregistered to the key management server 60 from the storage device 10. Incidentally, in the following explanation, there is a case where registering a key to the key management server is expressed as reregistering the key to the key management server.

Figure 12:
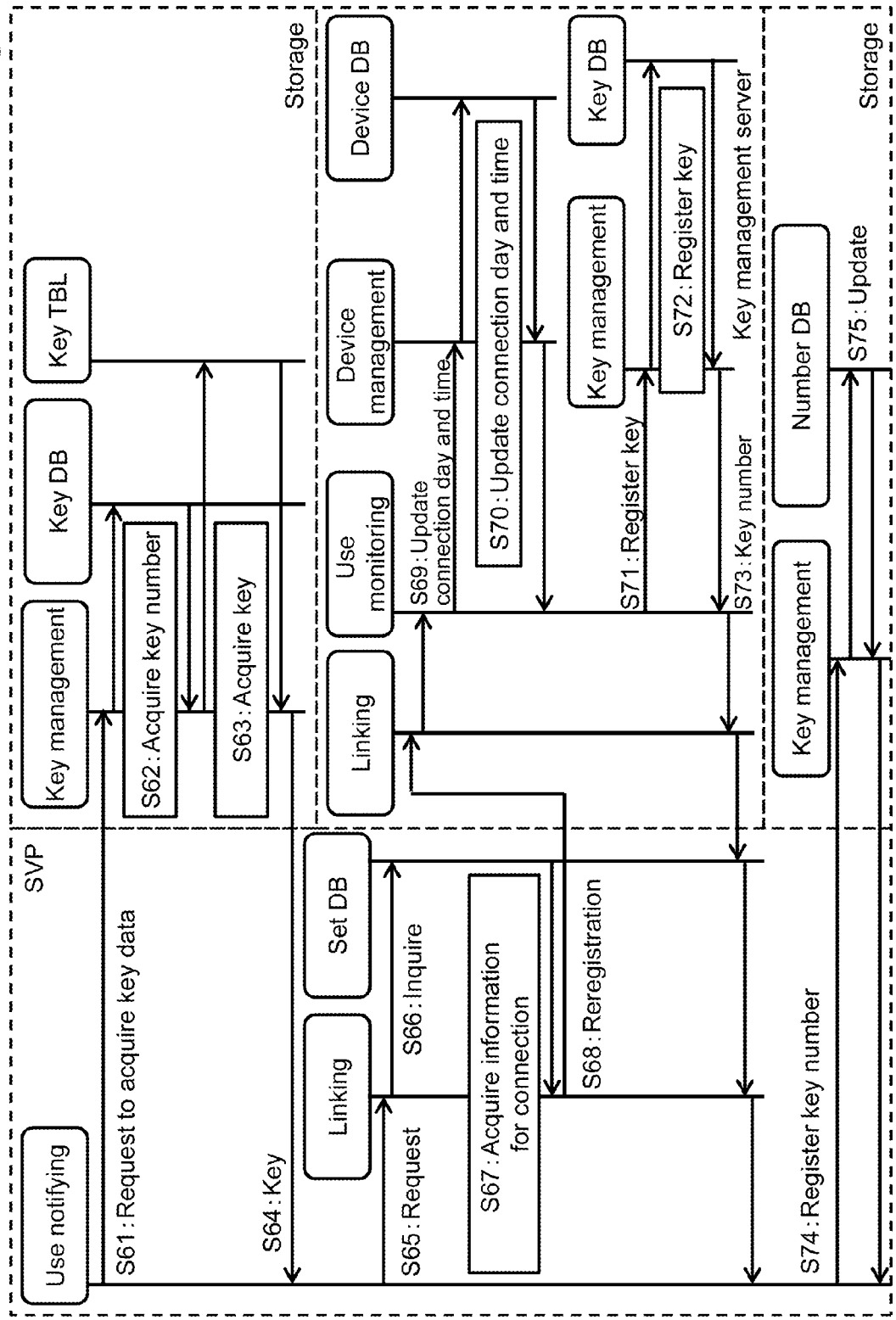
FIG. 12 is a flowchart showing processing of transmitting the key information being used in the storage device to register.

FIG. 12 is a flowchart showing processing in which the storage device 10 registers a key to the key management server 60.

The use notifying unit 162 of SVP 16 requests to acquire key data of an object of registration by explicitly indicating a key number on a server side to the key management unit 101 of the storage device 10 (S61). The key number explicitly indicated to the key management unit 101 is, for example, an unregistered key number (key number in key management server) notified from the key management server 60 at step S52 of FIG. 11.

The key management unit 101 acquires a key number in the storage device (storage side key number, or device side key number), and a server number of key management server 60 in correspondence therewith by retrieving a database stored in the key number storing unit 103 based on the server side key number received from the use notifying unit 162 (S62). The key management unit 101 retrieves the key table 102 based on the storage side key number, acquires key data in correspondence with the storage side key number (S63), and transmits the key data to the use notifying unit 162 (S64).

The use notifying unit 162 requests the linking unit 161 to register a key to the key management server 60 (S65). The request includes a server number for specifying a key management server of a registration destination acquired at step S84.

The linking unit 161 inquires with a database stored in the connection setting storing unit 164 about information for connecting to the key management server 60 which is the registration destination of the key to (S66), and acquires the information for connecting to the key management server 60 of the registration destination (S67). The linking unit 161 requests to reregister of the key by connecting to the key management server 60 by using the information acquired at step S67 (S68). The reregistration request includes the storage side key number and the key data.

The linking unit 65 of the key management server 60 delivers the reregistration request received from SVP 16 of the storage device 10 to the use monitoring unit 614. The use monitoring unit 614 requests the device information management unit 610 to update final day and time of connecting to the storage device (S69). The device information management unit 610 updates the final connection day and time of device information concerning the storage device requesting the reregistration in device information of a database stored to the device information storing unit 62 (S70).

The use monitoring unit 614 requests the key management unit 612 to reregister the key (S71). The key management unit 612 registers the key data requested from the storage device 10 to the database stored to the key information storing unit 63 (S72), and notifies the use notifying unit 162 of the server side key number newly set to the key data (S73).

The use notifying unit 162 requests the key management unit 101 of the storage device 10 to register the server side key number received at step S73 (S74). The key management unit 101 registers the server side key number to the database stored to the key number storing unit 103 along with the server number and the like (S75).

Figure 13:
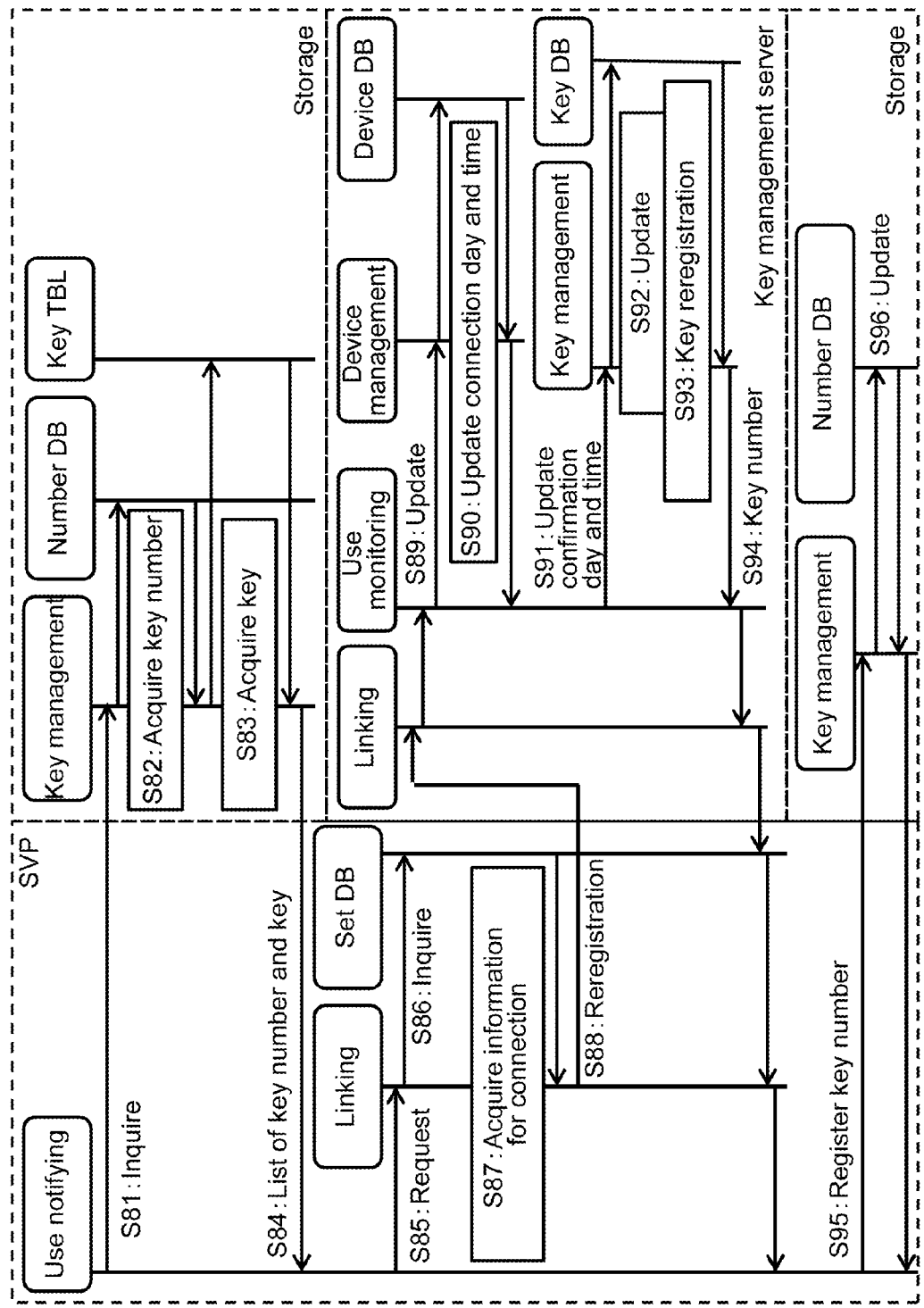
FIG. 13 is a flowchart showing other example of the processing of transmitting the key information being used in the storage device to the key management server to register.

FIG. 13 is a flowchart showing processing in which the key management server finds a key which is needed to be reregistered and registers the key to the key information storing unit 63.

The use notifying unit 162 of SVP 16 requests data and a key number of a key used in the storage device 10 to the key management unit 101 of the storage device 10 (S81). The key management unit 101 acquires all of key numbers by retrieving the database stored to the key number storing unit 103 (S82). Also, the key management unit 101 acquires data of keys used from the key table 102 (S83). The key management unit 101 transmits key data and a list of the key numbers to the use notifying unit 162 (S84).

The use notifying unit 162 requests the linking unit 161 to notify the key management server 60 of a key used in the storage device 10 (S85). The linking unit 161 inquires with the connection setting storing unit 164 about information used for connecting to the key management server 60 to be reported of a notification registration (S86), and acquires the information (S87). The linking unit 161 is connected to the key management server 60 by using the information acquired at step S87, and requests presence of the key used at the storage device 10 and reregistration in a case of finding an unregistered key to the linking unit 65 (S88). The request includes a server side key number and a list of key data.

When the use monitoring unit 614 of the key management server 60 receives the request from the use notifying unit 162 via the linking unit 65, the key management server 60 requests the device information management unit 610 to update the final connection day and time of the storage device 10 (S89). The device information management unit 610 updates final connection day and time of device information concerning the storage device 10 requesting reregistration in device information in the database stored to the device information storing unit 62 (S90).

The use monitoring unit 614 requests the key management unit 612 to update final confirmation day and time of a key using situation (S91). The key management unit 612 updates final confirmation day and time of key information concerning the storage device 10 which is an origin of issuing a reregistration request in key information in the database stored to the key information storing unit 63 (S92).

Also, when the key management unit 612 detects a server side key number which is not registered to the key information storing unit 63 in server side key numbers received from the storage device 10, the key management unit 612 stores key data in correspondence with the server side key number to the key information storing unit 63 (S93). The key management unit 612 notifies the use notifying unit 162 of SVP 16 of the server side key number set to registered key data via the use monitoring unit 614, the linking unit 65, the linking unit 161 and the like (S94).

The use notifying unit 162 requests the key management unit 101 of the storage device 10 to register the server side key number (S95). The key management unit 101 registers the server side key number to the database stored to the key number storing unit 103 (S96).

Consequently, it can be configured such that all of key numbers and key data of keys used in the storage device 10 are transmitted to the key management server 60, and the key management server 60 detects and registers unregistered keys.

According to the flowcharts shown in FIG. 11 and FIG. 12, the storage device 10 detects a key which is not registered to the key management server 60, and registers the unregistered key by transmitting key data of the unregistered key to the key management server 60. Consequently, a processing time period until detecting the unregistered key and a processing time period for registering the unregistered key are taken. On the other hand, the key number and key data only concerning the unregistered key may be transmitted from the storage device 10 to the key management server 60. Therefore, a communication load of the communication network CN3 can be alleviated.

In contrast thereto, in the flowchart shown in FIG. 12, the storage device 10 transmits information of all of keys to the key management server 60, and the key management server 60 detects and reregisters the unregistered key. Therefore, the unregistered key can be registered to the key management server 60 comparatively simply. On the other hand, key numbers and key data of all of keys are transmitted from the storage device 10 to the key management server 60, and therefore, the communication load of the communication network CN3 is increased.

Figure 14:
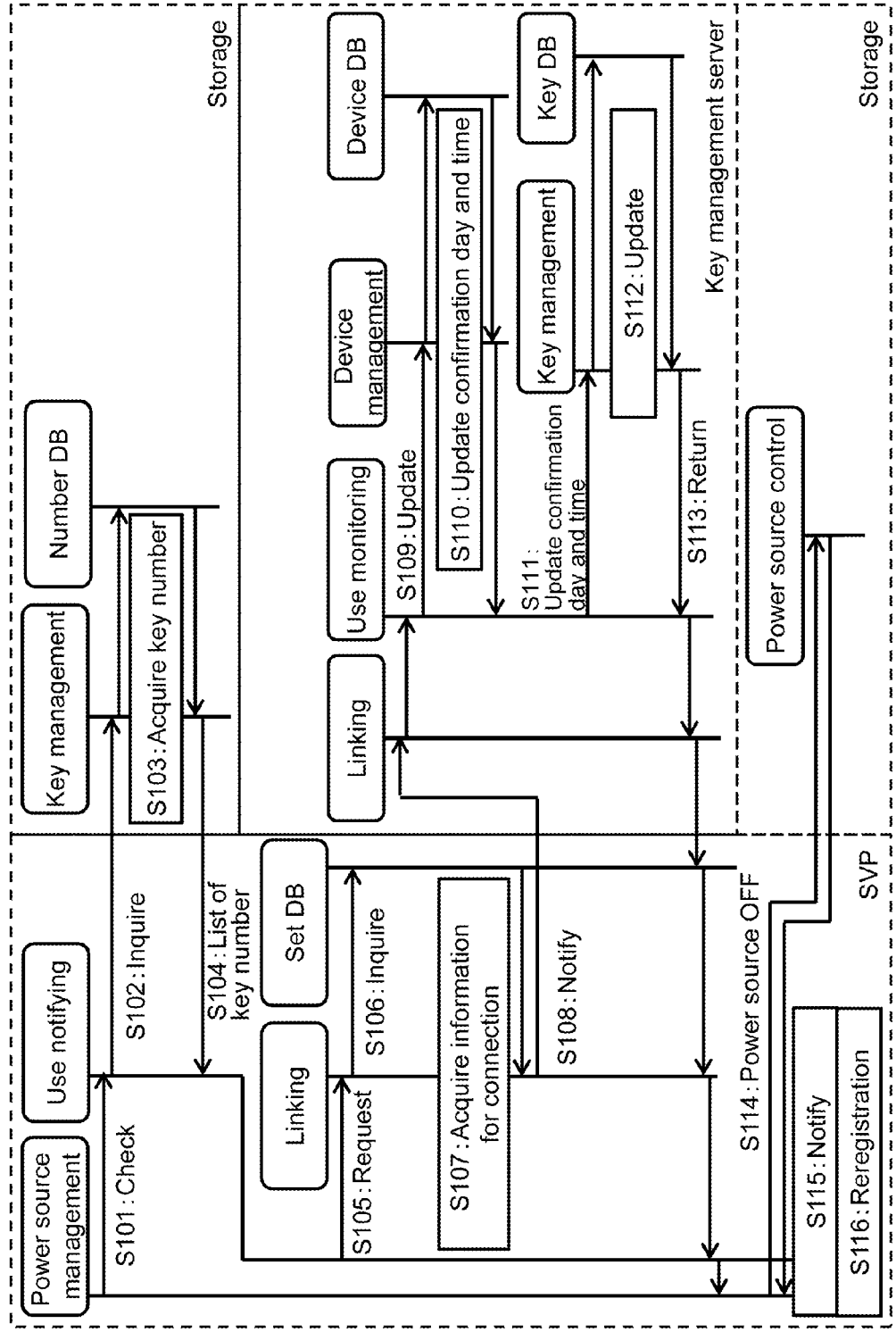
FIG. 14 is a flowchart showing processing in a case where stoppage of the storage device is designated.

FIG. 14 is a flowchart showing processing in a case of designating a power source of the storage device 10 OFF (stoppage of operation).

The system manager (storage manager) can designate the power source OFF from the management terminal 50 to the power source management unit 167 of SVP 16. The power source OFF signifies stoppage of electricity supplied from the power source device to the respective packages 11, 12, 13, 14, and 15 in the storage device 10. Incidentally, even in a case of making the power source OFF, a backup operation for an involatile memory area in the memory package 13 by an incorporated battery, or minimum electricity supply to a circuit necessary for receiving a restart signal or the like may be carried out.

The power source management unit 167 requests the use notifying unit 162 to check whether a key used in the storage device 10 is registered to the key management server 60 (S101) when power source OFF designation is received.

The use notifying unit 162 inquires with the key management unit 101 of the storage device 10 about a server side key number of a key used in the storage device 10 and a list of server numbers of the key management server 60 (S102).

The key management unit 101 acquires the server side key number of the key used in the storage device 10 and the server number of the key management server 60 from the database stored to the key number storing unit 103 (S103).

When the use notifying unit 162 receives the server side key number and the server number from the key management unit 101 (S104), the use notifying unit 162 requests the linking unit 161 to notify the key management server 60 of the key used in the storage device 10 (S105). The linking unit 161 inquires with the connection setting storing unit 164 about information used for connecting to the key management server 60 of a notification destination (S106), and acquires the information (S107). The linking unit 161 is connected to the key management server 60 by using the information acquired at step S107, and sends a notice about the key used in the storage device 10 (S108).

When the use monitoring unit 614 of the key management server 60 receives a notification from SVP 16 via the linking unit 65, the use monitoring unit 614 requests the device information management unit 610 to update final confirmation day and time to the storage device 10 (S109). The device information management unit 610 updates the final confirmation day and time of the device information in correspondence with the storage device 10 of a notification origin in the device information stored to the device information storing unit 62 (S110).

The use monitoring unit 614 requests the key management unit 612 to update final confirmation day and time of a key using situation (S111). The key management unit 612 updates final confirmation day and time of a situation of using the key information in correspondence with the server side key number notified from SVP 16 in key information in the database stored to the key information storing unit 63 (S112). In a case where the key management unit 612 detects a server side key number which is not registered to the database of the key information storing unit 63 in the server side key number notified from SVP 16, the key management unit 612 returns the unregistered server side key number to the power source management unit 167 of SVP 16 (S113).

The power source management unit 167 determines whether all of the keys used in the storage device 10 are managed by the key management server 60. In a case where the power source management unit 167 determines that all of the keys are managed by the key management server 60, the power source management unit 167 designates to make the power source OFF to the power source control unit 105 of the storage device 10 (S114). The power source control unit 105 starts a stoppage sequence for stopping electricity supplied to the respective packages of the storage device 10 in accordance with the designation.

In contrast thereto, when the power source management unit 167 determines that any one of the keys used in the storage device 10 is not managed by the key management server 60, the power source management unit 167 outputs an alarm for notifying the screen of the management terminal 50 of the determination (S115).

In this case, the power source management unit 167 does not designate to make the power source OFF to the power source control unit 105. Also, the power source management unit 167 can automatically execute processing for reregistering an unregistered key which is not managed by the key management server 60 to the key management server 60 (refer to FIG. 12) successively to the output of the alarm, or along with the output of the alarm. The power source management unit 167 may execute the processing of reregistering the key to the key management server 60 in a case where an authorization concerning key reregistration of the key by the system manager is inputted from the management terminal 50.

Consequently, in the case where the power source of the storage device 10 is designated to be made OFF, it is confirmed whether all of the keys used in the storage device 10 are managed by the key management server 60, and when it is determined that any one key is not managed by the key management server 60, the power source is not made OFF. In the case where it is confirmed that all of the keys used in the storage device 10 are managed by the key management server 60, the power source of the storage device 10 is made OFF.

Consequently, reliability and safety can be improved by preventing the key used in the storage device 10 from vanishing from the storage system beforehand. Also, in a case where an unregistered key which is not managed by the key management server 60 is detected, the case may be notified to the system manager, and therefore, efficiency and handiness of use of a managing operation of the system manager are improved. Furthermore, in a case of detecting an unregistered key, the unregistered key can be registered to the key management server 60 automatically or manually. Consequently, the efficiency and the handiness of use of the management operation can further be improved.

Figure 15:
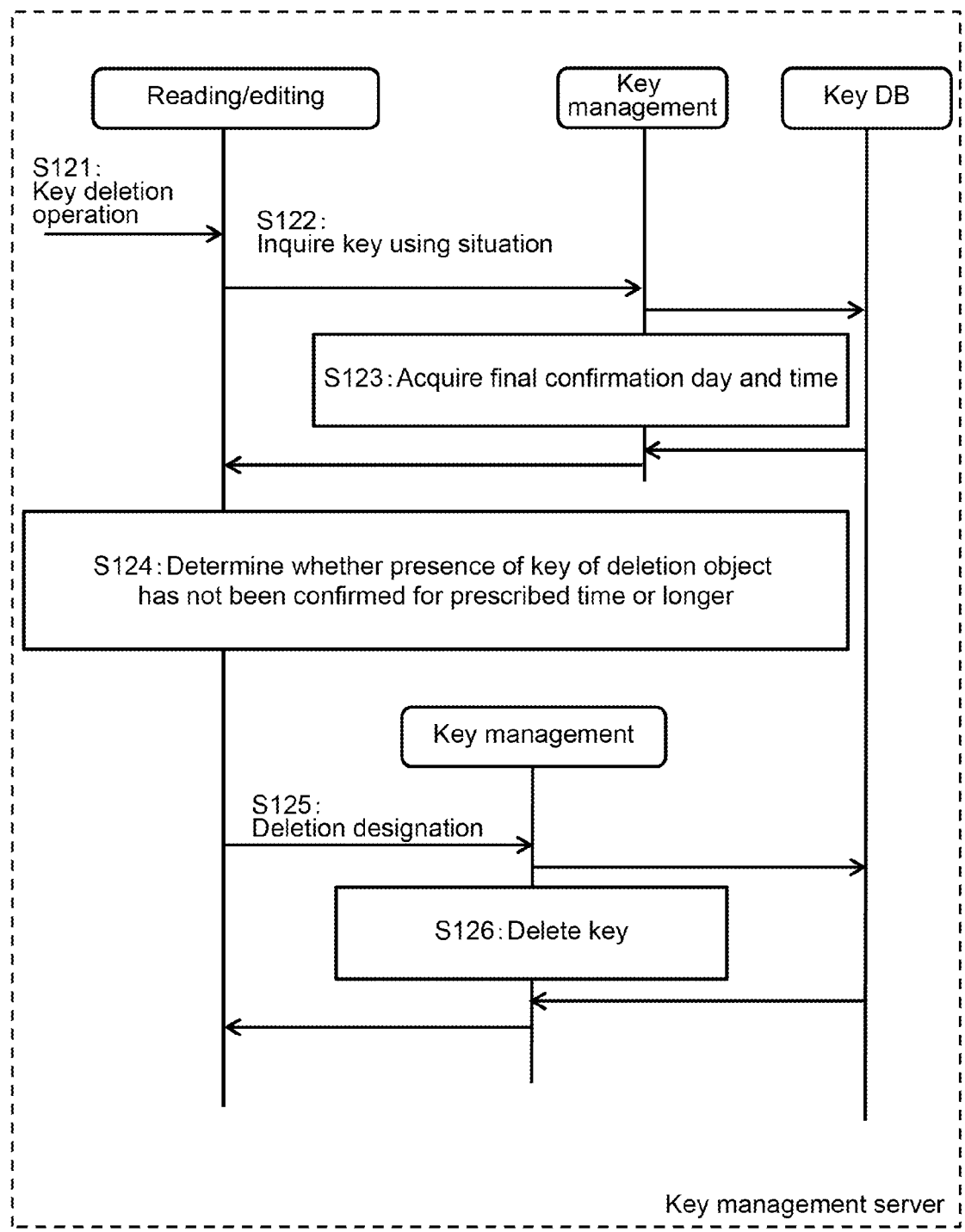
FIG. 15 is a flowchart showing processing of the key management server to which deletion of the key information is designated.

FIG. 15 is a flowchart showing processing in a case where deletion of a key is designated to the key management server 60.

The system manager (server manager) can designate to delete a key by using a reading/editing unit 64 of the key management server 60 (S121). The reading/editing unit 64 inquires with the key management unit 612 about a situation of using the key (S122). The key management unit 612 acquires final confirmation day and time of finally confirming a situation of using the key designated as an object of deletion from the database stored to the key information storing unit 63 (S123).

The reading/editing unit 64 determines whether presence of the key has not been confirmed for previously set prescribed time or longer based on final confirmation day and time of a situation of using the key of the deletion object (S124). In other words, the reading/editing unit 64 determines whether the key of the deletion object has not been used for a prescribed deletion prohibiting period or longer.

When the reading/editing unit 64 determines that the presence of the key of the deletion object has not been confirmed for the prescribed time or longer, the reading/editing unit 64 designates the key management unit 612 to delete the key (S125). Because it can be determined that the key the presence of which has not been confirmed for the prescribed time or longer is not used. Hence, the key management unit 612 deletes information of the designated key from the database of the key information storing unit 63 (S126). In contrast thereto, when the reading/editing unit 64 determines that the presence of the key of the deletion object is not confirmed within the prescribed time, the reading/editing unit 64 does not designate the key management unit 612 to delete the key.

Consequently, in the case where the system manager designates to the key management server 60 to delete a key, it is determined whether the key is being used in the storage device 10. In a case where the key is determined to be used, the key is not deleted and in a case where the key is determined not to be used, the key is deleted. Thereby, a key being used in the storage device 10 can be prevented from being deleted by an erroneous operation of the system manager or the like.

According to the example configured in this way, so far as the key is needed, the key management server 60 can continue managing the key. According to the example, it is confirmed whether all of the keys being used are managed by the key management server 60 before making the power source of the storage device 10 OFF, and makes the power source OFF when the confirmation is established. When the unregistered key (key which is not managed) is detected, the power source of the storage device is not made OFF, but the unregistered key is transmitted to the key management server 60 to reregister. Therefore, according to the example, the key is managed by the key management server 60 separately from the storage device 10, and loss of the key being used is prevented. Therefore, security, reliability, efficiency and handiness of use of the manager operation can be improved.

Also, according to the example, the key management server 60 does not delete a key being used in the storage device 10, and therefore, reliability and safety of the managing operation can be improved.

EXAMPLE 2

Example 2 will be explained in reference to FIG. 16 and FIG. 17. Following respective examples including the present example correspond to modified examples of Example 1, and therefore, an explanation will be given centering on differences from Example 1. According to the present example, in a case where an uncommunicatable key management server is present, a key used in the storage device is registered to other key management server.

Figure 16:
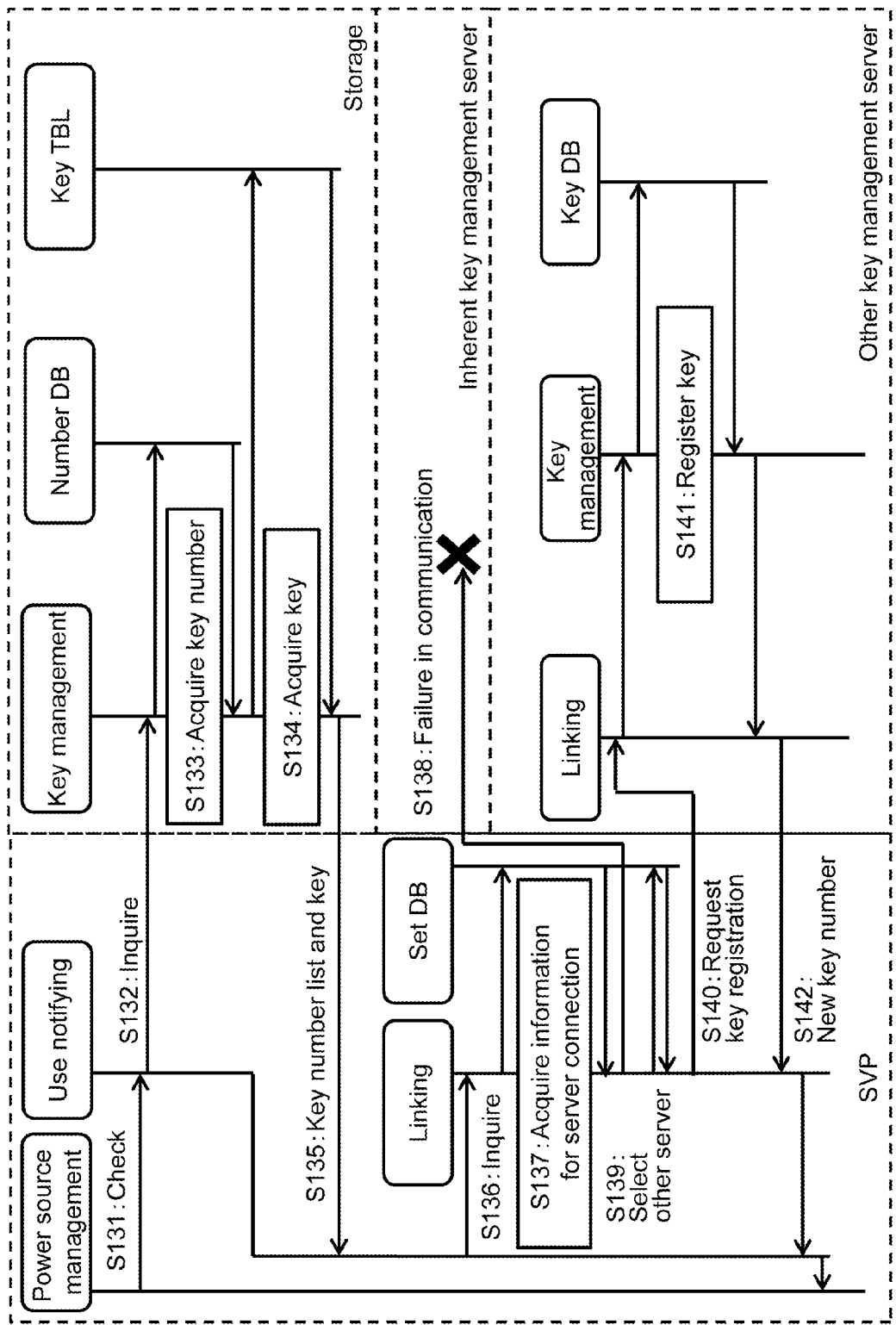
FIG. 16 is a flowchart showing processing in a case where stoppage of the storage device is designated according to Example 2.

FIG. 16 is a flowchart showing processing in a case where the power source of the storage device 10 is designated to be made OFF (stoppage of operation).

When the power source management unit 167 receives a designation of making the power source OFF, the power source management unit 167 requests the use notifying unit 162 to check whether a key used in the storage device 10 is registered in the key management server 60 (S131).

The use notifying unit 162 inquires with the key management unit 101 of the storage device 10 about a server side key number of a key used in the storage device 10, and a server number of the key management server 60 (S132).

The key management unit 101 acquires the server side key number of the key used in the storage device 10, and the list of server numbers of the key management server 60 from the database stored to the key number storing unit 103 (S133). Also, the key management unit 101 acquires data of the used key from the key table 102 (S134).

When the use notifying unit 162 receives the server side key number and the list of server numbers as well as all of key data from the key management unit 101 (S135), the use notifying unit 162 requests the linking unit 161 to notify the key management server 60 of the key used in the storage device 10 (S136). The linking unit 161 inquires with the connection setting storing unit 164 about information used for connecting the key management server 60 of a notification destination and acquires the same (S137).

Assume that although the linking unit 161 attempted to send a notice about the key used in the storage device 10 by connecting to the key management server 60 by using the information acquired at step S137, the communication is failed (S138). That is, assume that SVP 16 of the storage device 10 cannot be connected to the key management server 60 which is an inherent notification destination. For example, in a case where the key management server 60 of the notification destination is stopped by maintenance operation or hazard, the key used in the storage device 10 cannot be notified to the key management server 60.

When the linking unit 161 is failed in notifying the prescribed key management server (key management server of notification destination) 60, the linking unit 161 selects other key management server 60 as a notification destination, and acquires information for connecting the selected other key management server 60 from the connection setting storing unit 164 (S139). The linking unit 161 requests to register the key by being connected to the other key management server 60 (S140).

When the linking unit 65 of the other key management server 60 receives the request for registering the key, the key management unit 612 stores the received key data to the database of the key information storing unit 63 (S141). The key management unit 612 gives new server side key numbers respectively to key data registered to the key information storing unit 63, and returns the server side key numbers to SVP 16 (S142). The power source management unit 167 receives the server side key numbers via the use notifying unit 162.

Incidentally, the device information management unit 610 of the other key management server 60 registers information of the storage device 10 which is a transmission origin of the key data to the database of the device information storing unit 62, although not illustrated.

Figure 17:
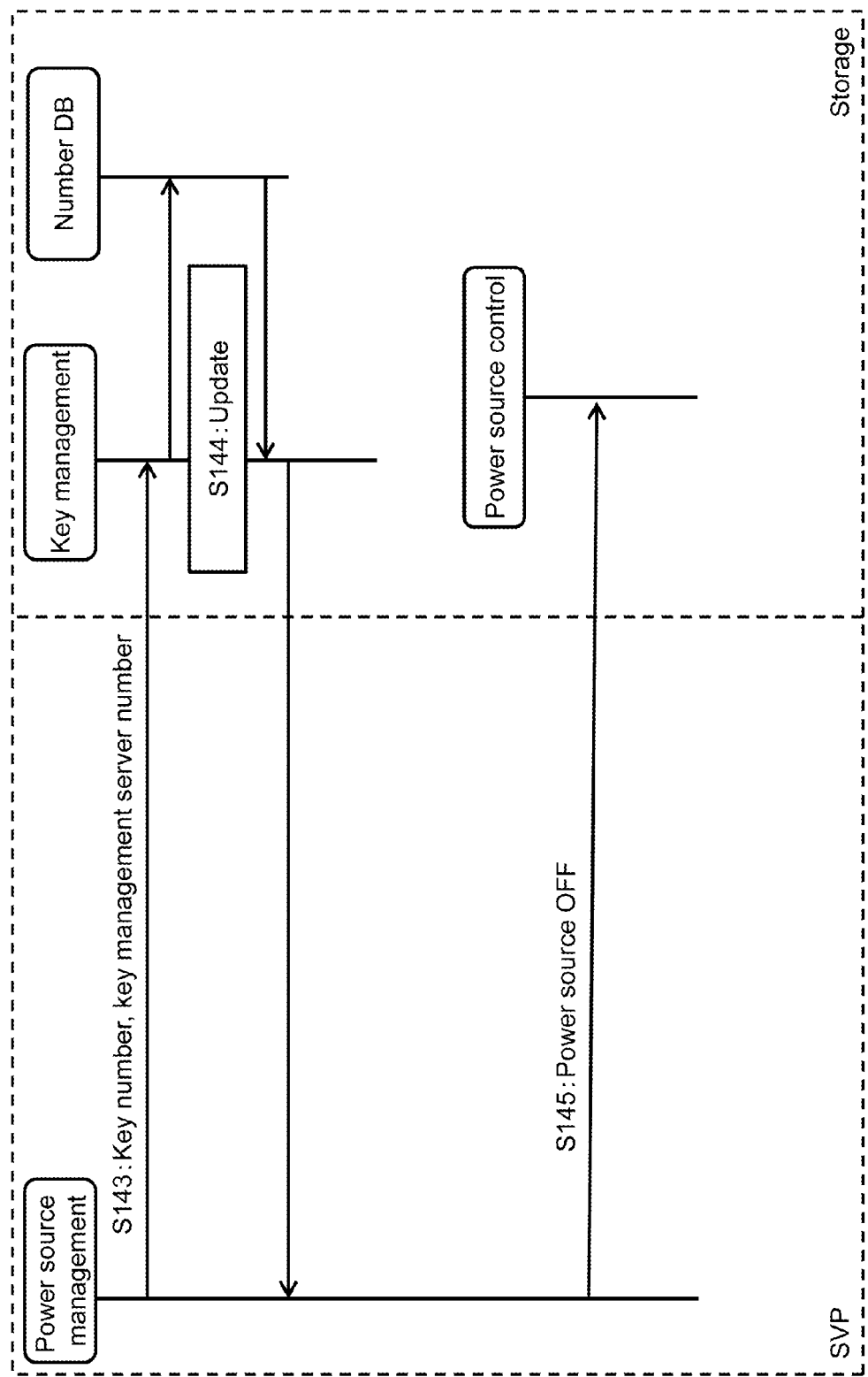
FIG. 17 is a flowchart continued from FIG. 16.

The explanation will be shifted to FIG. 17. The power source management unit 167 transmits the server side key number and the server number of the other key management server 60 to the key management unit 101 of the storage device 10, and requests to update the database of the key number storing unit 103. The key management unit 101 updates the database of the key number storing unit 103 (S144).

When the power source management unit 167 confirms that the key used in the storage device 10 is registered to the other key management server 60, the power source management unit 167 designates to make the power source OFF to the power source control unit 105 (S145). The power source control unit 105 starts the stoppage sequence for stopping to supply electricity supplied to the respective packages of the storage device 10 in accordance with the designation.

Even the present example configured in this way can achieve operation and effect similar to those of Example 1. Furthermore, according to the example, in a case where the inherent key management server 60 cannot be utilized, the key used in the storage device 10 is registered to the other key management server 60. Therefore, reliability and solidity of the storage system are further improved.

EXAMPLE 3

Example 3 will be explained in reference to FIG. 18. According to the example, in a case where the power source of the storage device 10 is designated to be OFF, the propriety of making the power source OFF is determined by information in the storage device 10.

Figure 18:
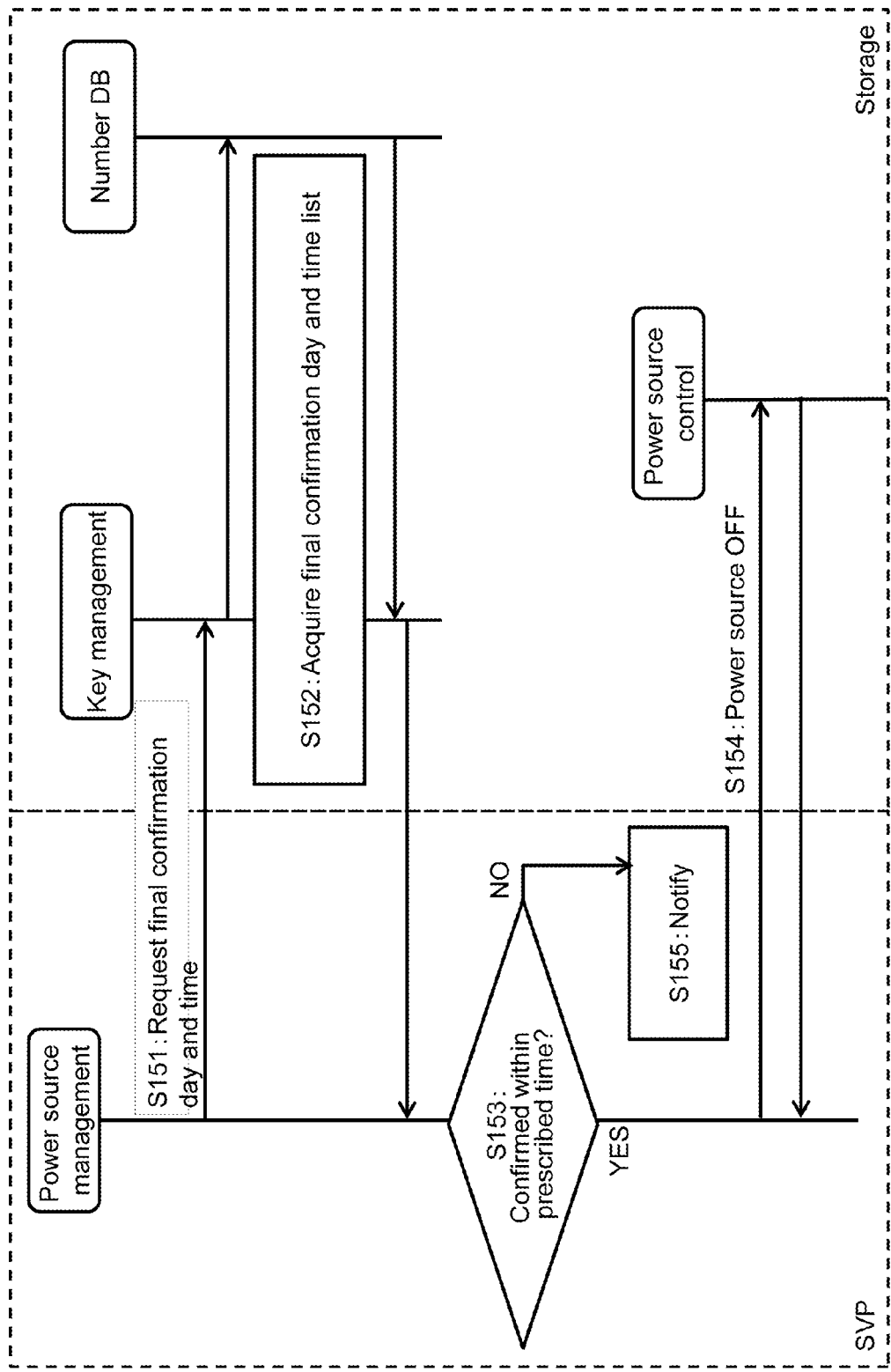
FIG. 18 is a flowchart showing processing in a case where stoppage of the storage device is designated according to Example 3.

FIG. 18 is a flowchart showing processing in a case of designating to make the power source OFF to the storage device 10. When the system manager designates to make the power source OFF to the power source management unit 167 of SVP 16 via the UI unit 168, the power source management unit 167 requests the key management unit 101 of the storage device 10 to transfer day and time at which the key management server 60 finally confirms a situation of using a key (S151). The key management unit 101 acquires day and time of finally confirming the situation of using the key by the key management server 60 from the database stored to the key number storing unit 103 (S152), and returns the confirmation day and time list to the power source management unit 167.

The power source management unit 167 determines whether all of keys used in the storage device 10 are confirmed within prescribed time based on the list of finally confirmed day and time of the situation of using the keys by the key management server 60 (S153).

When the power source management unit 167 determines that presence of all the keys managed by the storage device 10 is confirmed by the key management server 60, the power source management unit 167 designates to make the power source OFF to the power source control unit 105 (S154). The key management server 60 confirms presence of all the keys within the prescribed time, and therefore, it can be presumed that the key management server 60 manages all the keys.

In contrast thereto, when the power source management unit 167 determines that there is a key the presence of which is not confirmed by the key management server 60 for the prescribed time or longer in any of keys managed by the storage device 10, the power source management unit 167 sends a notice of an alarm (S155). It can be determined that the keys the presence of which is not confirmed for the prescribed time or longer by the key management server 60 are not managed by the key management server 60, that is, the keys are not registered to the key management server 60. Hence, the power source management unit 167 notifies the system manager (storage manager) that there is a key which is not managed by the key management server 60, but is held only by the storage device 10 to the system manager (storage manager). The power source management unit 167 does not designate to make the power source OFF to the power source control unit 105.

Thereafter, all the keys used in the storage device 10 are registered to the key management server 60 by carrying out processing of reregistering the key described above by a manual designation from the system manager, or automatically. The power source management unit 167 designates the power source control unit 105 to make the power source storage device 10 OFF after confirming that all the keys are held by the key management server 60.

The present example configured in this way also achieves operation and effect similar to those of Example 1. Also, according to the present example, the propriety of making the power source OFF can be determined based on information (day and time of finally confirming the situation of using the key) held in the storage device 10 when the power source of the storage device 10 is made OFF. Consequently, according to the present example, the power source can be made OFF by determining the propriety of making the power source OFF only by the storage device 10 without needing to inquire with the key management server 60 about whether all the keys are managed. As a result, the power source of the storage device 10 can be made OFF by a simpler method while maintaining reliability of the storage system, and handiness of use is improved.

EXAMPLE 4

Example 4 will be explained in reference to FIG. 19. According to the present example, an operation of the storage device 10, and an operation of the key management server 60 are set beforehand concerning management of key. The key management server 60 and the storage device 10 are configured as physically different devices, and installed to be physically remote from each other, and therefore, operations for improving reliability concerning an encryption key can be set respectively separately.

Figure 19:
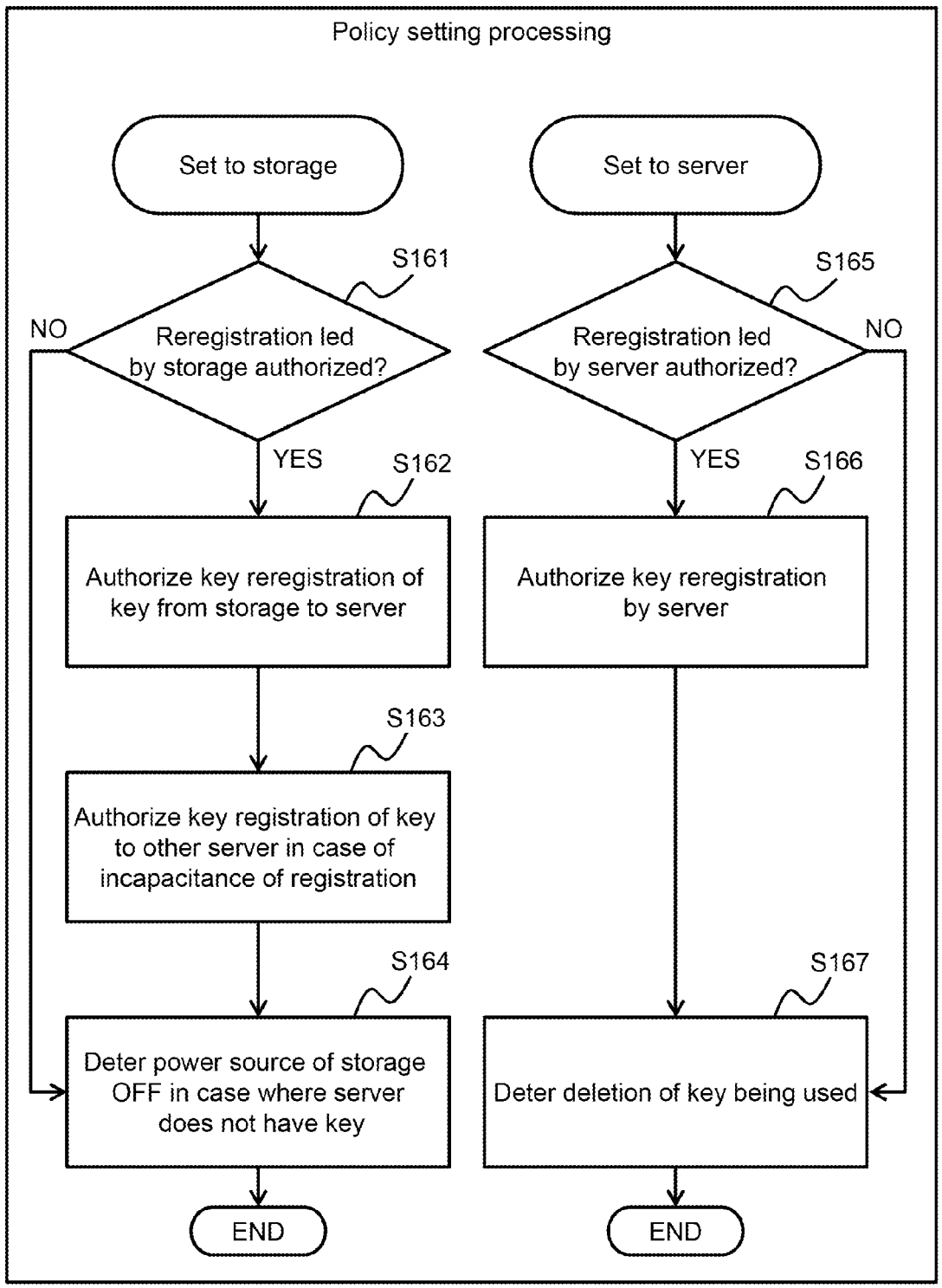
FIG. 19 is a flowchart showing processing of setting a policy for determining operations of the storage device and the key management server according to Example 4.

Policy setting processing shown in FIG. 19 shows setting of a storage side policy for defining the operation of the storage device 10 (S161 through S164), and setting of a server side policy for defining the operation of the key management server 60 (S165 through S167).

First, the setting of the storage side policy will be explained. The system manager (storage manager) can set the policy for the storage device 10 from the management terminal 50 via the UI unit 168.

SVP 16 of the storage device 10 determines whether reregistration of the key to the key management server 60 is authorized by being led by the storage device 10 (S161). The reregistration processing of key led by the storage device 10 is processing of transmitting an unregistered key which is not managed by the key management server 60 from the storage device 10 to the key management server 60 to register as described in reference to, for example, FIG. 12.

When SVP 16 determines that the reregistration processing of key by being led by the storage device 10 is authorized (S161: YES), SVP 16 authorizes the use notifying unit 162 to reregister the key to the key management server 60 (S162).

Next, SVP 16 authorizes the use notifying unit 162 to register the key to the other key management server 60 in a case where the key registration to the inherent key management server 60 cannot be carried out (S163). A description has been given of the processing in reference to FIG. 16.

Finally, SVP 16 sets the power source management unit 167 not to make the power source of the storage device 10 OFF in a case where any one of all the keys used in the storage device 10 is not managed by the key management server 60 (S164). Incidentally, SVP 16 proceeds to step S164 by skipping steps S162 and S163 in a case where the reregistration of the key from the storage device 10 to the key management server 60 is not authorized (S161: NO).

Setting of a server side policy will be explained. The system manager (server manager) can set the operation of the key management server 60 by using a terminal at outside of the drawing.

The key management server 60 determines whether the key used in the storage device 10 is authorized to be registered by being led by the key management server 60 (S165). The reregistration processing of the key by being led by the key management server 60 is processing described in reference to, for example, FIG. 13. The key management server 60 receives data of all of the keys beforehand from the storage device 10, and registers only an unregistered key to the key management server 60 from thereamong.

When the key management server 60 determines that the reregistration of the key by the key management server 60 is authorized (S165: YES), the key management server 60 authorizes the reregistration of the key to the use monitoring unit 614 (S166). Also, in a case where deletion of a key being used in the storage device 10 is designated, the key management server 60 sets not to designate the deletion (S167). Incidentally, in a case where the determination is NO at step S165, the processing proceeds to S167 by skipping step S166.

Also the present example configured in this way achieves operation and effect similar to those of Example 1. Also, the present example can set the operation of the storage device 10 and the key management server 60 concerning the management of the key in accordance with, for example, necessity or an object of use. Therefore, according to the present embodiment, the handiness of use is further improved.

EXAMPLE 5

Figure 20:
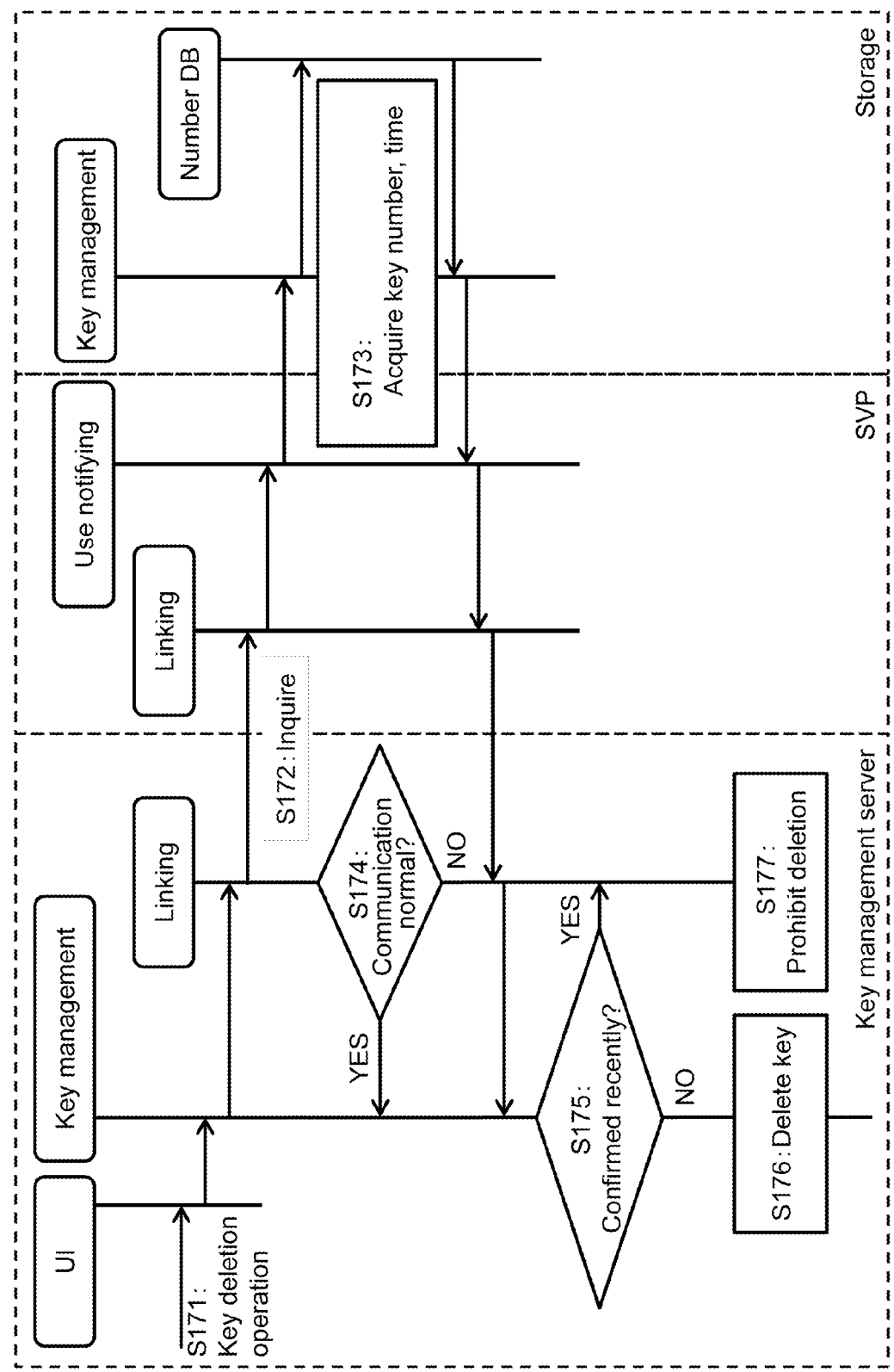
FIG. 20 is a flowchart showing processing in a case where deletion of the key information is designated to the key management server according to Example 5.

Example 5 will be explained in reference to FIG. 20. According to the present example, in a case where a key managed by the key management server 60 is designated to delete, the key management server 60 inquires with the storage device 10 about a situation of using the key of an object of deletion.

When the system manager (server manager) designates to delete a key via the reading/editing unit 64 (S171), the key management unit 612 inquires with the storage device 10 about the key of the object of deletion via the linking unit 65 (S172).

When the key management unit 101 of the storage device 10 receives the inquiry from the key management server 60 via the linking unit 161 and the use notifying unit 162, the key management unit 101 acquires the server side key number and time of finally confirming a situation of using the key concerning the key of the deletion object from the database of the key number storing unit 103 (S173).

The key management unit 612 of the key management server 60 determines whether communication is carried out normally when the key management unit 612 acquires the server side key number and the final confirmation day and time concerning the key of the deletion object from the key management unit 101 of the storage device 10 (S174).

The key management unit 612 of the key management server 60 prohibits the deletion of the key (S177) when the communication with the storage device 10 is determined not to be normal (S174: NO).

The key management unit 612 determines whether the presence of the key is confirmed within prescribed time based on day and time of finally confirming the key of the deletion object (S175) in a case where the communication with the storage device 10 is normal (S174: YES). When the key management unit 612 determines that the presence of the key of the deletion object is not confirmed for prescribed time or longer (S175: NO), the key management unit 612 deletes the key from the database of the key information storing unit 63 (S176).

Also the present example configured in this way achieves operation and effect similar to those of Example 1. Also, according to the present example, in a case of deleting the key, a newest situation of using the key at the storage device 10 is confirmed, and therefore, the key can be deleted more safely than in the processing shown in FIG. 15.

EXAMPLE 6

Example 6 will be explained in reference to FIG. 21. According to the present example, life of a key is previously set, and when deletion of the key is designated, both of a situation of using the key at the storage device 10 and life of the key are taken into consideration.

Figure 21:
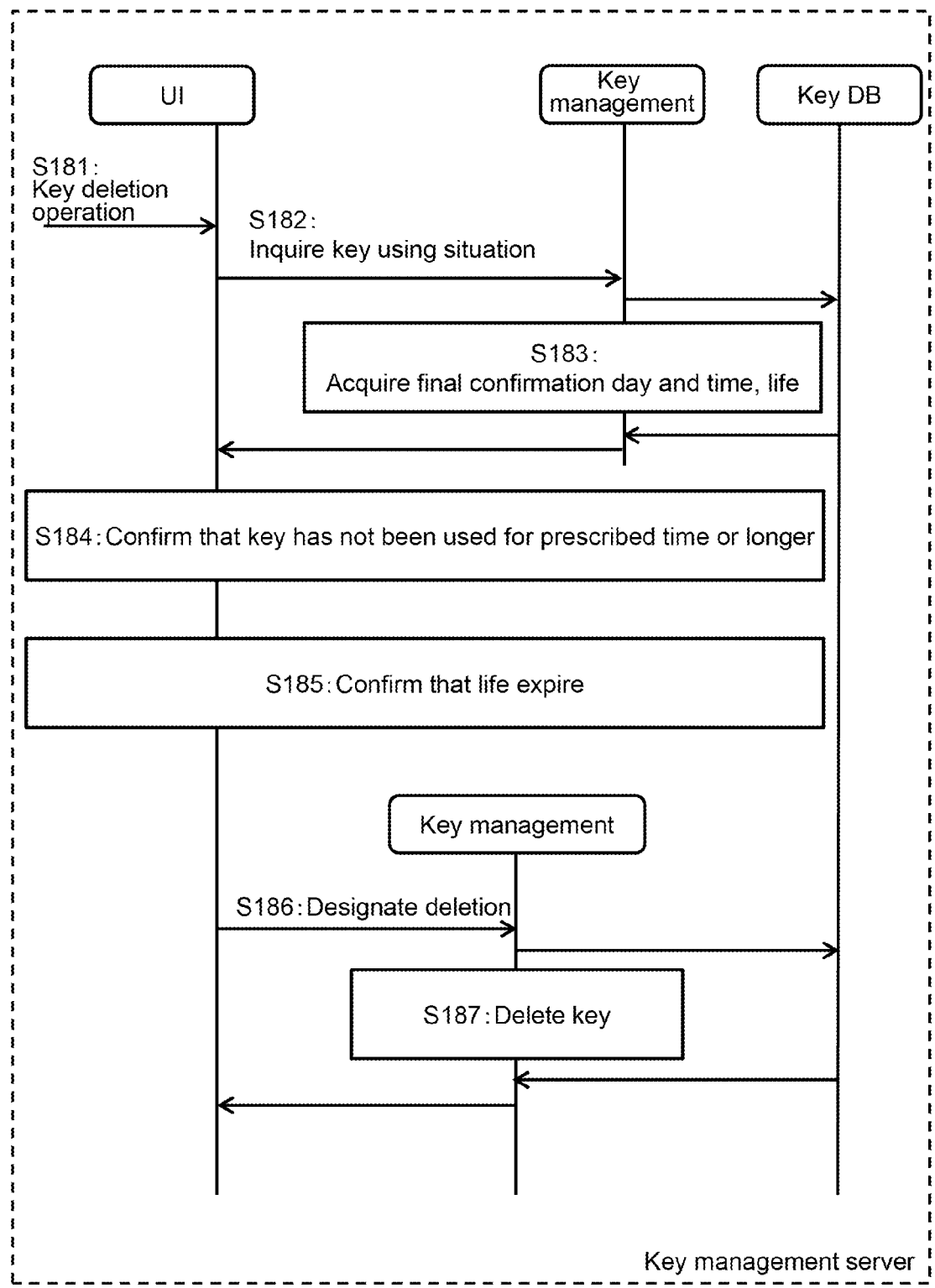
FIG. 21 is a flowchart showing processing of the key management server to which deletion of the key management information is designated according to Example 6.

FIG. 21 is a flowchart showing processing in a case where deletion of a key managed by the key management server 60 is designated.

The system manager (server manager) designates to delete the key by using the reading/editing unit 64 of the key management server 60 (S181). The reading/editing unit 64 inquires with the key management unit 612 about a situation of using the key (S182). The key management unit 612 acquires from the database of the key information storing unit 63 final confirmation day and time of finally confirming the situation of using the key designated as a deletion object (S183).

The reading/editing unit 64 determines whether the presence of the key has not been confirmed for previously set prescribed time or longer based on final day and time of confirming the situation of using the key of the deletion object (S184). Also, the reading/editing unit 64 confirms whether life set to the key of the deletion object expires (S185). The key management server 60 can set life indicating an effective period of the key when the key is created.

When the reading/editing unit 64 determines that the presence of the key of the deletion object is not confirmed for the prescribed time or longer and the life of the key expires, the reading/editing unit 64 designates the deletion of the key to the key management unit 612 (S186). The key management unit 612 deletes information of the designated key from the database of the key information storing unit 63 (S187). In either of cases of a case where the presence of the key of the deletion object is confirmed within the prescribed time, or a case where the life of the key does not expire, the reading/editing unit 64 does not designate the deletion to the key management unit 612.

The present example configured in this way also achieves operation and effect similar to those of Example 1. Also, according to the example, the key is deleted also in consideration of the life (effective period) of the key, and therefore, the key can be deleted more safely.

Incidentally, the present invention is not limited by the respective examples described above. The skilled person can perform various additions or changes within the range of the present invention. For example, technical features of the present invention described above can be embodied by being pertinently combined with each other.

For example, the present invention can also be expressed as an information processing system or a storage device as follows.

Expression 1

An information processing system including: a first device managing key information; and a second device connected to the first device bi-directionally communicatably, and using the key information managed by the management device, wherein the second device acquires the key information from the first device, stores the key information in a volatile memory area, performs prescribed data processing by using the key information, determines whether the key information is managed by the first device in a case where stoppage of an operation is designated, stops an operation in a case where the key information is determined to be managed by the first device, and does not stop the operation in a case where the key information is not managed by the first device.

Expression 2

The information processing system described in Expression 1, wherein in a case where the key information is determined not to be managed by the first device, the second device outputs a notification to that effect.

Expression 3

The information processing system described in either of Expression 1 or 2, wherein in the case where the key information is determined not to be managed by the first device, the second device transmits the key information to be registered in the first device.

REFERENCE SIGNS LIST

1 Key
10 Storage device
21 Memory device
30 Host computer
50 Management terminal
60 Key management server

The invention claimed is:

1. A storage device which is communicatably connected to a management server managing key information, the storage device comprising: a memory device; and
    a controller being configured to control the memory device, the controller being configured to implement encryption processing on data inputted and outputted to and from the memory device by using a piece of key information;
    to determine whether the key information used by the controller is managed by the management server when stoppage of an operation is indicated, and
    to stop the operation in a case where the key information is determined to be managed by the management server, and not to stop the operation in a case where the key information is determined not to be managed by the management server;
    wherein, in the case where the key information is determined not to be managed by the management server, the controller transmits the key information to the management server to register only the Lev information which is not managed by the management server, of all pieces of key information, by transmitting to the management server all the pieces of kev information including the kev information determined not to be managed by the management server, and stops the operation after confirming that the management server has registered the kev information; and
    wherein the controller selects a preset other management server in a case where the kev information cannot be transmitted to be registered in the management server, transmits all the pieces of kev information to the selected other management server to register, and stops the operation after confirming that the other management server has registered all the pieces of key information.

2. The storage device according to claim 1, characterized in that in the case where the key information is determined not to be managed by the management server, the controller outputs a notification to that effect.

3. The storage device according to claim 2, characterized in that in the case where the key information is determined not to be managed by the management server, the controller outputs a notification to confirm the key information registration in the management server.

4. The storage device according to claim 3, characterized in that in a case where the key information registration in the management server is authorized, the controller transmits the key information to the management server to register the information in the management server.

5. The storage device according to claim 1, characterized in that the controller holds key confirmation information indicating a time point at which the management server confirms the key information used by the controller, determines that the key information, in which a difference between a confirmation time point recorded in the key confirmation information and a current time point is within a prescribed time period, is managed by the management server, and stops the operation.

6. The storage device according to claim 1, characterized in that the controller transmits information concerning the key information used by the controller to the management server such that in a case where a deletion of any of the key information managed by the management server is indicated to the management server, the management server does not delete the key information used by the controller.

7. A controlling method for a storage device communicatably connected to a management server managing key information, the method comprising:

implementing encryption processing on data inputted and outputted to and from a memory device by using key information;

determining whether stoppage of an operation is indicated;

determining whether the key information used by the storage device is managed by the management server in a case where the stoppage of the operation is determined to be indicated; and stopping the operation in a case where the key information is determined to be managed by the management server, and not stopping the operation in a case where the key information is determined not to be managed by the management server:

wherein, in the case where the key information is determined not to be managed by the management server, the controller transmits the key information to the management server to register only the key information which is not managed by the management server, of all pieces of key information, by transmitting to the management server all the pieces of key information including the key information determined not to be managed by the management server; and stops the operation after confirming that the management server has registered the key information; and wherein the controller selects a preset other management server in a case where the key information cannot be transmitted to be registered in the management server, transmits all the pieces of key information to the selected other management server to register, and stops the operation after confirming that the other management server has registered all the pieces of key information.

8. The controlling method for a storage device according to claim 7, characterized in that the operation is not stopped in the case where the key information is determined not to be managed by the management server, and a notification stating that the key information is not managed by the management server is outputted.

9. The controlling method for a storage device according to claim 8, characterized in that the notification also includes a notification to confirm whether the key information is registered in the management server.

10. The controlling method for a storage device according to claim 7, characterized in that the key information is transmitted to the management server to be registered in the management server in the case where the key information is determined not to be managed by the management server.

* * * * *